(12) United States Patent
Karimisetty et al.

(10) Patent No.: US 7,694,143 B2
(45) Date of Patent: *Apr. 6, 2010

(54) METHOD OF AND SYSTEM FOR COLLECTING AN ELECTRONIC SIGNATURE FOR AN ELECTRONIC RECORD STORED IN A DATABASE

(75) Inventors: Srikanth Karimisetty, Peekskill, NY (US); Srinivasulu Puri, White Plains, NY (US); Charanjeet Singh, Redwood City, CA (US); Ravindra Akella, White Plains, NY (US); Savita Durgada, Tarrytown, NY (US)

(73) Assignee: Oracle International Corporation, Redwood Shores, CA (US)

( * ) Notice: Subject to any disclaimer, the term of this patent is extended or adjusted under 35 U.S.C. 154(b) by 940 days.

This patent is subject to a terminal disclaimer.

(21) Appl. No.: 10/731,299

(22) Filed: Dec. 8, 2003

(65) Prior Publication Data

US 2005/0108536 A1    May 19, 2005

Related U.S. Application Data

(60) Provisional application No. 60/523,221, filed on Nov. 18, 2003.

(51) Int. Cl.
*H04L 9/32* (2006.01)
(52) U.S. Cl. .................. 713/176; 713/193; 707/9
(58) Field of Classification Search ............ 713/156, 713/176, 180, 193; 707/1, 9, 10, 100, 102, 707/200, 3; 705/50, 1; 709/201, 229, 246; 726/26–30, 1, 2
See application file for complete search history.

(56) References Cited

U.S. PATENT DOCUMENTS 5,128,885 A * 7/1992 Janis et al. .............. 714/45

| | | |
|---|---|---|
| 5,434,917 A | 7/1995 | Naccache et al. |
| 5,504,818 A | 4/1996 | Okano |

(Continued)

OTHER PUBLICATIONS

"FDA 21 CFR Part 11," Document Resources, http://www.documentresources.com/document/21cfrpart11.html, pp. 1-2, printed Jun. 23, 2003.
"The Role of Technology Solutions in the Pharmaceutical and Biotechnology Industries' Search for 21 CFR Part 11 Compliance," Life Science CIO Forum, www.lifesciencesCIOforum.com, pp. 1-7 (2002).

(Continued)

*Primary Examiner*—Kimyen Vu
*Assistant Examiner*—Nirav Patel
(74) *Attorney, Agent, or Firm*—Townsend and Townsend and Crew LLP

(57) ABSTRACT

A method of and system for collecting an electronic signature for an electronic record stored in a database. In one embodiment the method comprises automatically creating an electronic record from data stored in a plurality of different database tables in response to the occurrence of a predetermined event; storing an instance of the electronic record in a common repository of electronic records that provides an audit trail that cannot be altered or disabled by users of the system; executing a rule associated with the electronic record to determine whether an electronic signature is required to connote review and/or approval of the electronic record; and if execution of the rule results in a determination that an electronic signature is required, marking the instance of the electronic record as unsigned and initiating a request to collect the required electronic signature. In some embodiments the electronic record is stored as unstructured data in a character large object (CLOB) format and the unstructured data comprises a well-formed XML document stored within a column of a table stored in the database.

25 Claims, 14 Drawing Sheets

U.S. PATENT DOCUMENTS

| | | | |
|---|---|---|---|
| 5,560,005 | A | 9/1996 | Hoover et al. |
| 5,724,575 | A | 3/1998 | Hoover et al. |
| 5,884,321 | A | 3/1999 | Meffert |
| 5,899,991 | A | 5/1999 | Karch |
| 5,978,475 | A | 11/1999 | Schneier et al. |
| 6,240,407 | B1 | 5/2001 | Chang et al. |
| 6,295,513 | B1 | 9/2001 | Thackston |
| 6,366,934 | B1 | 4/2002 | Cheng et al. |
| 6,456,955 | B1 | 9/2002 | Andrews et al. |
| 6,584,459 | B1* | 6/2003 | Chang et al. ............... 707/3 |
| 6,604,100 | B1 | 8/2003 | Fernandez et al. |
| 6,647,388 | B2 | 11/2003 | Numao et al. |
| 6,796,489 | B2 | 9/2004 | Slater et al. |
| 6,807,633 | B1 | 10/2004 | Pavlik |
| 6,820,082 | B1 | 11/2004 | Cook et al. |
| 6,928,396 | B2 | 8/2005 | Thackston |
| 6,947,945 | B1 | 9/2005 | Carey et al. |
| 6,959,281 | B1 | 10/2005 | Freeling et al. |
| 6,978,366 | B1* | 12/2005 | Ignatchenko et al. ........ 713/166 |
| 6,983,423 | B2 | 1/2006 | Dvorak et al. |
| 6,990,585 | B2* | 1/2006 | Maruyama et al. .......... 713/176 |
| 7,039,805 | B1 | 5/2006 | Messing |
| 7,039,807 | B2* | 5/2006 | Spitz ........................ 713/170 |
| 7,089,235 | B2 | 8/2006 | Dettinger et al. |
| 7,093,133 | B2* | 8/2006 | Hopkins et al. ............. 713/176 |
| 7,093,207 | B1 | 8/2006 | Liao et al. |
| 7,136,873 | B2 | 11/2006 | Smith et al. |
| 7,143,103 | B1* | 11/2006 | Zisman et al. ............... 707/102 |
| 7,146,500 | B2* | 12/2006 | Hawkins et al. ............. 713/176 |
| 7,165,179 | B2* | 1/2007 | Maruyama et al. .......... 713/176 |
| 7,174,328 | B2 | 2/2007 | Stanoi et al. |
| 7,185,192 | B1 | 2/2007 | Kahn |
| 7,210,037 | B2* | 4/2007 | Samar ....................... 713/176 |
| 7,228,300 | B2 | 6/2007 | Lei et al. |
| 7,337,950 | B2 | 3/2008 | DeVault |
| 2001/0002485 | A1 | 5/2001 | Bisbee et al. |
| 2001/0021928 | A1* | 9/2001 | Ludwig et al. ................ 705/67 |
| 2001/0039545 | A1* | 11/2001 | Nishizawa ..................... 707/9 |
| 2002/0010764 | A1 | 1/2002 | Spicer |
| 2002/0023083 | A1 | 2/2002 | Durkalski |
| 2002/0040431 | A1* | 4/2002 | Kato et al. .................. 713/168 |
| 2002/0049670 | A1 | 4/2002 | Moritsu et al. |
| 2002/0078068 | A1 | 6/2002 | Krishnaprasad et al. |
| 2002/0107652 | A1 | 8/2002 | Andrews et al. |
| 2002/0116363 | A1 | 8/2002 | Grainger |
| 2002/0143726 | A1 | 10/2002 | Planalp et al. |
| 2002/0156756 | A1 | 10/2002 | Stanley et al. |
| 2002/0157006 | A1* | 10/2002 | Narishima et al. .......... 713/177 |
| 2003/0009295 | A1 | 1/2003 | Markowitz et al. |
| 2003/0033275 | A1 | 2/2003 | Alpha et al. |
| 2003/0061158 | A1 | 3/2003 | Guy et al. |
| 2003/0065936 | A1 | 4/2003 | Wray |
| 2003/0069795 | A1 | 4/2003 | Boyd et al. |
| 2003/0069894 | A1 | 4/2003 | Cotter et al. |
| 2003/0078880 | A1* | 4/2003 | Alley et al. ................... 705/38 |
| 2003/0088776 | A1 | 5/2003 | Lin et al. |
| 2003/0131241 | A1 | 7/2003 | Gladney |
| 2003/0149608 | A1 | 8/2003 | Kall et al. |
| 2003/0150908 | A1 | 8/2003 | Pokorny et al. |
| 2003/0177041 | A1 | 9/2003 | Millican et al. |
| 2003/0196108 | A1 | 10/2003 | Kung |
| 2003/0200130 | A1 | 10/2003 | Kall et al. |
| 2003/0233618 | A1 | 12/2003 | Wan |
| 2004/0003353 | A1 | 1/2004 | Rivera et al. |
| 2004/0039706 | A1 | 2/2004 | Skowron et al. |
| 2004/0068757 | A1 | 4/2004 | Heredia |
| 2004/0123108 | A1* | 6/2004 | Winkler et al. ............... 713/176 |
| 2004/0186826 | A1 | 9/2004 | Choi et al. |
| 2004/0187124 | A1 | 9/2004 | Labelle |
| 2004/0187127 | A1 | 9/2004 | Gondi et al. |
| 2004/0215634 | A1 | 10/2004 | Wakefield et al. |
| 2004/0236660 | A1 | 11/2004 | Thomas et al. |
| 2004/0243595 | A1 | 12/2004 | Cui et al. |
| 2005/0027651 | A1 | 2/2005 | DeVault |
| 2005/0044369 | A1* | 2/2005 | Anantharaman ............ 713/176 |
| 2005/0102158 | A1 | 5/2005 | Maeda |
| 2005/0108153 | A1 | 5/2005 | Thomas et al. |
| 2005/0132201 | A1 | 6/2005 | Pitman et al. |
| 2005/0240770 | A1 | 10/2005 | Lane et al. |
| 2006/0069605 | A1 | 3/2006 | Hatoun |

OTHER PUBLICATIONS

"21CFR Part 11 Opportunity or Challenge? With an Analysis of Oracle's OPM," Life Science CIO Forum, www.lifesciencesCIOforum.com, pp. 1-14 (2002).

Bertino et al. "Integrating XML and Databases" IEEE Internet Computing Jul.-Aug. 2001.

Chueh et al., "An XML Portable Chart Format," 1998, Proc AMIA Symp., pp. 730-734.

FDA, Guidance for Industry Part 11, Electronic Records; Electronic Signatures—Scope and Application, Aug. 2003.

Mathieson, "Implementing Oracle Workflow," European Oracle User Group 1999 Presentation pp. 1-11.

Meehan, "Deploying Hummingbird Document and Records Management Products to Comply with 21 CFR Part 11:Electronic Records; Electronic Signatures," Apr. 2003, Hummingbird.

Muirhead, "Impact of 21 CFR Part 11 on clinical laboratories: An overview," Aug. 2001, American Clinical Laboratory, pp. 33-34.

Noferi et at. "Information Age Audits" BioPharm Jan. 2002 pp. 35-39 and 50.

Oracle, Oracle Workflow Release 2.6.2 Business Event System and PL/SQL Development Guidelines Oct. 2001 26 pages.

Oracle, "Question & Answer Document for Oracle Appsworld" Jan. 19-22, 2003 p. 1-81.

Oracle, Oracle Life Sciences Platform Feature Summary, Feb. 2003, Oracle Corp.

Papazoglou, "The World of e-Business: Web-Services, Workflows, and Business Transactions" WES 2002, LNCS 2512, pp. 153-173,2002.

SmarTeam, SMARTEAM—FDA Compliance Configuration (SFA), IBM/SmarTeam, Sep. 2003.

SmarTeam, SMARTeam™ FDA Compliance Technical Paper Functional Compliance With FDA Rule 21 CFR Part 11, Jul. 2002, SMARTEAM Corp.

Stember, LABTrack: Introducing a legal electronic lab notebook, 221st National Meeting, American Chemical Society, Division of Chemical Information, Apr. 1, 2001.

* cited by examiner

30a

| Name | Datatype | Length | Mandatory | Comments |
|---|---|---|---|---|
| DOCUMENT_ID | NUMBER | | Yes | Unique document id |
| PSIG_XML | CLOB | (4000) | | XML document |
| PSIG_DOCUMENT | CLOB | (4000) | | Electronic record as seen by user |
| PSIG_DOCUMENTFORMAT | VARCHAR2 | (100) | | Format of the Document |
| PSIG_TIMESTAMP | DATE | | | Timestamp when the document was requested |
| PSIG_TIMEZONE | VARCHAR2 | (240) | | Time Zone the document was initiated |
| DOCUMENT_REQUESTER | VARCHAR2 | (240) | | Document requester |
| PSIG_STATUS | VARCHAR2 | (32) | | Status of the document (ERROR, PENDING, COMPLETE) |
| PSIG_SOURCE | VARCHAR2 | (32) | | Source of the Document |
| EVENT_NAME | VARCHAR2 | (80) | | Event associated to the document |
| EVENT_KEY | VARCHAR2 | (240) | | Event instance identifier |
| PRINT_COUNT | NUMBER | | | Number of time document requested from printing |
| CREATION_DATE | DATE | | | WHO Column |
| CREATED_BY | NUMBER | | | WHO Column |
| LAST_UPDATE_DATE | DATE | | | WHO Column |
| LAST_UPDATED_BY | NUMBER | | | WHO Column |
| LAST_UPDATE_LOGIN | NUMBER | | | WHO Column |

30b

| Name | Datatype | Length | Mandatory | Comments |
|---|---|---|---|---|
| SIGNATURE_ID | NUMBER | | | Signature ID |
| DOCUMENT_ID | NUMBER | | | Document Id Refers EDR_PSIG_DOCUMENTS |
| EVIDENCE_STORE_ID | NUMBER | | | Evidence Store Id if the signature are present in Server Tech Storage |
| USER_NAME | VARCHAR2 | (100) | | User name who signed the Document |
| USER_RESPONSE | VARCHAR2 | (100) | | User Response |
| SIGNATURE_TIMESTAMP | DATE | | | Signed Time and Date |
| SIGNATURE_TIMEZONE | VARCHAR2 | (240) | | Signature Time Zone |
| SIGNATURE_STATUS | VARCHAR2 | (32) | | Signature Status (PENDING, COMPLETE, ERROR) |
| CREATION_DATE | DATE | | | WHO Columns |
| CREATED_BY | NUMBER | | | WHO Column |
| LAST_UPDATE_DATE | DATE | | | WHO Column |
| LAST_UPDATED_BY | NUMBER | | | WHO Column |
| LAST_UPDATE_LOGIN | NUMBER | | | WHO Column |

*Fig. 2*

| Rule | Attribute | Approver(s) |
|---|---|---|
| If PLANT = "Plant 1" And PRODUCT = "Cyanide" | eRecord = Yes eSignature = Yes eRecord Style Sheet = StyleSheet12.X51 | James Dunn and Mark Arthur |
| If PLANT = "Plant 1" | eRecord = Yes eSignature = No eRecord Style Sheet = NULL | David Anderson |

Table 33a

| Name | Null? | Type | Description |
|---|---|---|---|
| ELEMENT_ID | NOT NULL | NUMBER | Surrogate Primary Key. |
| XML_ELEMENT | NOT NULL | VARCHAR2(30) | XML element identified as being searchable |
| DTD_ROOT_ELEMENT |  | VARCHAR2(30) | Root element of the XML |
| APPLICATION_ID | NOT NULL | NUMBER | Application ID of the application owning the query element. |
| INDEX_SECTION_NAME | NOT NULL | VARCHAR2(30) | Name of the section created in the index for the query element |
| INDEX_TAG | NOT NULL | VARCHAR2(64) | Tag used to create the section in the index. Unique Constraint. |
| STATUS | NOT NULL | CHAR(1) | Status of the query element. It can be I(ndexed) or N(ot Indexed). |
| CREATED_BY | NOT NULL | NUMBER(15) | Standard WHO column |
| CREATION_DATE | NOT NULL | DATE | Standard WHO column |
| LAST_UPDATED_BY | NOT NULL | NUMBER(15) | Standard WHO column |
| LAST_UPDATE_LOGIN |  | NUMBER(15) | Standard WHO column |
| LAST_UPDATE_DATE | NOT NULL | DATE | Standard WHO column |

Table 33b

| Name | Null? | Type | Description |
|---|---|---|---|
| ELEMENT_ID | NOT NULL | NUMBER | Partial Primary key. |
| LANGUAGE | NOT NULL | VARCHAR2(4) | Partial Primary key. Language used for translatable columns |
| SOURCE_LANG |  | VARCHAR2(4) | Source language |
| DISPLAY_NAME | NOT NULL | VARCHAR2(100) | Display name of the query element. This would be visible to end users. |
| DESCRIPTION |  | VARCHAR2(100) | Description of the query element. |
| CREATED_BY | NOT NULL | NUMBER(15) | Standard WHO column |
| CREATION_DATE | NOT NULL | DATE | Standard WHO column |
| LAST_UPDATED_BY | NOT NULL | NUMBER(15) | Standard WHO column |
| LAST_UPDATE_LOGIN |  | NUMBER(15) | Standard WHO column |
| LAST_UPDATE_DATE | NOT NULL | DATE | Standard WHO column |

Table 33c

| Name | Null? | Type | Description |
|---|---|---|---|
| USAGE_ID | NOT NULL | NUMBER | Surrogate primary key |
| ELEMENT_ID | NOT NULL | NUMBER | XML element used in creating the security rule. |
| ELEMENT_USAGE | NOT NULL | CHAR(1) | The usage of the XML element. It can be Q(uery) or S(ecure) |
| CREATED_BY | NOT NULL | NUMBER(15) | Standard WHO column |
| CREATION_DATE | NOT NULL | DATE | Standard WHO column |
| LAST_UPDATED_BY | NOT NULL | NUMBER(15) | Standard WHO column |
| LAST_UPDATE_LOGIN |  | NUMBER(15) | Standard WHO column |
| LAST_UPDATE_DATE | NOT NULL | DATE | Standard WHO column |

*Fig. 9*

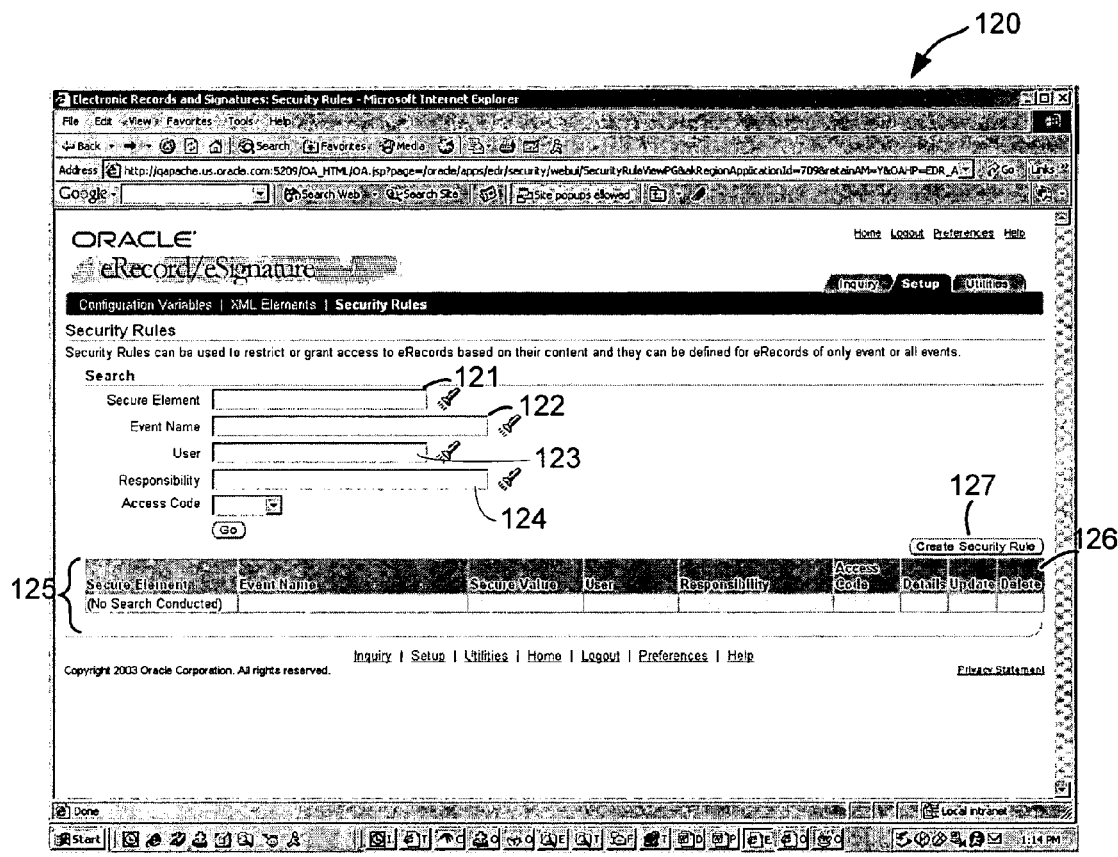

*Fig. 10*

| Name | Null? | Type | Description |
|---|---|---|---|
| RULE_ID | NOT NULL | NUMBER | Surrogate primary key |
| ELEMENT_ID | NOT NULL | NUMBER | XML element used in creating the security rule. |
| EVENT_NAME | | VARCHAR2(240) | Business event name used in creating the security rule. |
| SECURE_VALUE | NOT NULL | VARCHAR2(100) | Value secured by the security rule |
| USER_ID | | NUMBER(15) | User ID of the APPS user for whom security is created |
| RESPONSIBILITY_ID | | NUMBER(15) | Responsibility ID of the APPS responsibility for which security is created |
| ACCESS_CODE | NOT NULL | CHAR(1) | Access code can be G(rant) or R(estrict) |
| START_DATE | NOT NULL | SYSDATE | Start date for the rule |
| END_DATE | | SYSDATE | End date for the rule |
| CREATED_BY | NOT NULL | NUMBER(15) | Standard WHO column |
| CREATION_DATE | NOT NULL | DATE | Standard WHO column |
| LAST_UPDATED_BY | NOT NULL | NUMBER(15) | Standard WHO column |
| LAST_UPDATE_LOGIN | | NUMBER(15) | Standard WHO column |
| LAST_UPDATE_DATE | NOT NULL | DATE | Standard WHO column |

METHOD OF AND SYSTEM FOR COLLECTING AN ELECTRONIC SIGNATURE FOR AN ELECTRONIC RECORD STORED IN A DATABASE

CROSS-REFERENCES TO RELATED APPLICATIONS

This application claims the benefit of U.S. Provisional Application No. 60/523,221, entitled eSIGNATURES AND eRECORDS SYSTEM, by Srikanth Karimisetty et al., filed Nov. 18, 2003, the disclosure of which is incorporated herein by reference. This application is also being filed concurrently with U.S. application Ser. No. 10/731,657, entitled METHOD AND SYSTEM FOR ASSOCIATING AN ELECTRONIC SIGNATURE WITH AN ELECTRONIC RECORD, by Srikanth Karimisetty et al.; and with U.S. application Ser. No. 10/731,673, entitled METHOD OF AN SYSTEM FOR SEARCHING UNSTRUCTURED DATA STORED IN A DATABASE, by Srikanth Karimisetty et al.; and with U.S. application Ser. No. 10/731,604, entitled METHOD OF AND SYSTEM FOR CREATING QUERIES THAT OPERATE ON UNSTRUCTURED DATA STORED iN A DATABASE, by Srikanth Karimisetty et al.; and with U.S. application Ser. No. 10/731,655, entitled METHOD OF AND SYSTEM FOR COMMITTING A TRANSACTION TO A DATABASE, by Srikanth Karimisetty et al.; and with U.S. application Ser. No. 10/731,623, entitled METHOD OF AND SYSTEM FOR DETERMINING IF AN ELECTRONIC SIGNATURE IS NECESSARY IN ORDER TO COMMIT A TRANSACTION TO A DATABASE, by Srinivasulu Pun et al., the disclosures of which are incorporated herein by reference.

BACKGROUND OF THE INVENTION

The present invention relates to a method of and system for securely storing and accessing electronic records, capturing electronic signatures and securely associating captured electronic signatures with corresponding electronic records. Embodiments of the invention are useful to a variety of companies in a variety of different industries and some embodiments are particularly useful in helping pharmaceutical, medical device, and food manufacturing companies ensure compliance with Good Manufacturing Practice regulations (GMPs) as the companies produce and test products that people/animals use.

Historically, organizations manually tracked huge volumes of data from day-to-day business transactions in hard copy format. The requirements of maintaining such hard copies differed from one organization to another and in some instances depended in part on government led mandates for standard operating procedures. For example, if a pharmaceutical company based in the United States wanted to maintain records documenting the creation of a new drug from its inception to the clinical test stage it had to maintain a huge volume of paper based records in accordance with Food and Drug Administration (FDA) regulations. It can be appreciated that searches through such records for particular pieces of information could be a time consuming activity. It can also be appreciated that if access to particular classes of the hard copy records needs to be controlled for security reasons, physically separating the confidential documents from the regular ones becomes a highly tedious job.

Accordingly, many organizations have switched from paper-based records systems to electronic-based records (sometime referred to herein as eRecords). With the advent of eRecords, all business transaction records of an organization are stored electronically in a common data store of a business application software system. Some systems that store electronic records use XML (extensible Markup Language) technology because XML is an open, extensible and nonproprietary format.

While storing XML-based eRecords may significantly reduce paperwork previously required, the ability to efficiently search all existing eRecords is still a challenging task due to the flexible structure of the XML records themselves. The flexible XML structure of eRecords also makes restricting access to certain XML records in an organization a challenging proposition.

In addition to these challenges, eRecord systems must also be able to support the ability to electronically sign the electronic documents, ensuring that the appropriate personnel have reviewed and approved them. GMPs generally require signatures on transactions that affect product quality. Companies may also require signatures when moving the custody of goods from one location or department to another or when moving responsibility for manufacturing from one department to another. In general, wherever companies have generally required a paper signature in the past for such transactions, a signature is needed on the electronic document that replaces it once the company has made the switch from a paper-based world to electronic documents.

Accordingly, systems and methods for addressing the challenges in an electronic-based records system and systems and methods for handling electronic signature requirements in an electronic-based records system are needed.

BRIEF SUMMARY OF THE INVENTION

Embodiments of the invention provide an improved electronic-based records system that addresses the challenges discussed above.

According to one embodiment of the invention, a method of collecting an electronic signature for an electronic record stored in a database is disclosed. The method comprises automatically creating an electronic record from data stored in a plurality of different database tables in response to the occurrence of a predetermined event; storing an instance of the electronic record in a common repository of electronic records that provides an audit trail that cannot be altered or disabled by users of the system; executing a rule associated with the electronic record to determine whether an electronic signature is required to connote review and/or approval of the electronic record; and if execution of the rule results in a determination that an electronic signature is required, marking the instance of the electronic record as unsigned and initiating a request to collect the required electronic signature. In one particular implementation of this embodiment, the electronic record is stored in a common repository of electronic records that provides an audit trail that cannot be altered or disabled by users of the database. In some implementations the electronic record is stored as unstructured data in a character large object (CLOB) format and the unstructured data comprises a well-formed XML document stored within a column of a table stored in the database.

In another embodiment, a method of associating an electronic signature with an electronic record is disclosed. The method comprises allowing a user to define an event that, upon occurrence, generates an electronic record that requires an electronic signature; allowing a user to define the fields stored in the electronic record; allowing a user to generate a map that maps data from underlying database tables to at least some of the fields defined for the electronic record; allowing a user to define a layout for displaying data in the electronic record on a computer display when an electronic signature for the data record is collected; allowing a user to identify a signatory approver for the electronic record; in response to the occurrence of the event, generating the electronic record and displaying the electronic record to the signatory approver according to the defined layout; receiving an electronic signature from the signatory approver; and associating the electronic signature with the electronic record. In some implementations of this embodiment the method further comprises verifying the electronic signature prior to associating the signature with the electronic record.

In another embodiment, a method of committing a transaction to a database is provided. The method comprises initiating a database transaction; creating an electronic record that includes transaction data from the database transaction; executing a rule associated with the record to determine whether an electronic signature is required to connote review and/or approval of the electronic record, and if execution of the rule results in a determination that an electronic signature is required, requesting the electronic signature prior to committing the transaction to the database.

Another embodiment of the invention pertains to a method of searching unstructured data stored in a database. The method comprises storing a plurality of electronic records, each comprising unstructured data stored in a character large-object (CLOB) format in a column of a table of the database, in a common repository of electronic records in the database that provides an audit trail that cannot be altered or disabled by users of the system; creating a security protocol that protects the electronic records against unauthorized access; creating a query designed to identify electronic records in the database that meet criteria designated in the query; prior to executing the query, modifying the query in accordance with the security protocol to create a modified query; running the modified query against the unstructured data. In some implementations of these embodiments, access to records in the database is automatically granted unless security protocol restricts such access and the security protocol comprises a plurality of security rules that restricts access to the records within the database. In other implementations, access to records in the database is automatically denied unless security protocol grants such access and the security protocol comprises a plurality of security rules that grant access to the record within the database. In one particular implementation of this embodiment, the database is a common repository of electronic records that are generated from multiple data sources. In some implementations the unstructured data comprises a well-formed XML document stored within a column of a table stored in the database.

Another embodiment of the invention pertains to a method of searching unstructured data stored in a database where the method comprising storing unstructured data in a column of a database table; allowing a user to identify elements in the unstructured data as indexed elements; creating an intermediate index into the unstructured data from the identified elements; and allowing a user to create queries on the unstructured data using the indexed elements. In some implementations of this embodiment the unstructured data comprises a well-formed XML document stored within a column of a database table. Also, in some implementations the unstructured data is part of an electronic record stored in a common repository of electronic records that provides an audit trail that cannot be altered or disabled by users of the database.

In still another embodiment of the invention, a method of intercepting a transaction instantiated by a database application to determine if an electronic signature is necessary to commit the transaction to the database is disclosed. The method comprises calling an application program interface to raise an event in response to a triggering action generated by the database application; initiating a workflow process that executes a rule to determine if an electronic signature is required to approve the transaction; and if execution of the rule results in a determination that an electronic signature is required for the transaction, instantiating a signature collection process. In some implementations of this embodiment the method further comprises obtaining an electronic signature in response to the signature collection process and thereafter, verifying the electronic signature and updating a filed of the electronic record to indicate a valid signature was collected if the electronic signature is verified.

Other embodiments of the invention include computer systems comprising a processor, a database and a computer-readable memory coupled to the processor, where the computer-readable memory is configured to store a computer program that allows the processor to perform the methods described herein. And still additional embodiments of the invention are directed to computer programs stored on computer-readable storage mediums where the computer program comprises code for carrying out the methods described herein.

These and other embodiments of the invention along with many of its advantages and features are described in more detail in conjunction with the text below and the attached figures.

BRIEF DESCRIPTION OF THE DRAWINGS

FIG. 2 illustrates one example of the data format used to store electronic records in evidence store 30 shown in FIG. 1B;

FIG. 9 illustrates one example of database tables that can be used to track indexed elements as part of index 33 shown in FIG. 1B according to one embodiment of the invention;

FIGS. 10, 12 and 20 are examples of computer display screen shots generated by a graphical user interface to assist a user in creating security rules according to one embodiment of the invention;

FIG. 11 illustrates one example of a database table used to track security rules according to one embodiment of the invention; and FIGS. 13, 14, 17-19 and 21 are examples of computer display screen shots generated by a graphical user interface to assist a user in creating queries according to one embodiment of the invention.

DETAILED DESCRIPTION OF THE INVENTION

In some industries a process can be viewed as a pre-defined method of producing goods. Such processes typically include several events and sub-events where an event is an operation or group of operations to be performed to accomplish a task. The execution of events such as these are time, material and resource sensitive. Organizations often desire to track the execution of events to make sure that the event has been completed as required by the process that the event is part of. To achieve this, checkpoints can be implemented at each event or sub-event to keep track of information such as: what is the event? who initiated the event? when was it initiated? who authorized the event? when was it completed? who confirmed the event completion? etc.

This information can be captured electronically and stored in a database so that it can be subsequently retrieved using query based user interfaces or reports. Embodiments of the invention allow a company or other organization to compile and store electronic records that track various events defined by the company. Embodiments also allow electronic signatures to be captured and linked with their respective electronic data records so that the electronic signatures to be kept as part of a data record's audit trail. As used herein an "electronic signature" (sometimes referred to as an "eSignature") is a computer data compilation of any symbol or series of symbols executed, adopted or authorized by an individual to be the legally binding equivalent of the individual's handwritten signature. An electronic signature contains at least two distinct components: an ID and a password. An electronic signature connotes authorship, review and approval of data and can be displayed and printed with signed electronic records. A "digital signature" is an electronic signature based upon cryptographic methods of originator authentication, computer by using a set of rules and a set of parameters such that the identify of the signer and the integrity of the data can be verified.

Some embodiments of the invention operate in a closed system. As used herein, a "closed system" is an environment in which system access is controlled by persons who are responsible for the content of electronic records that are on the system. In contrast, an open system is an environment in which system access is not controlled by persons who are responsible for the content of electronic records that are on the system. An example of an open system is an online trading community.

Figure 1A:
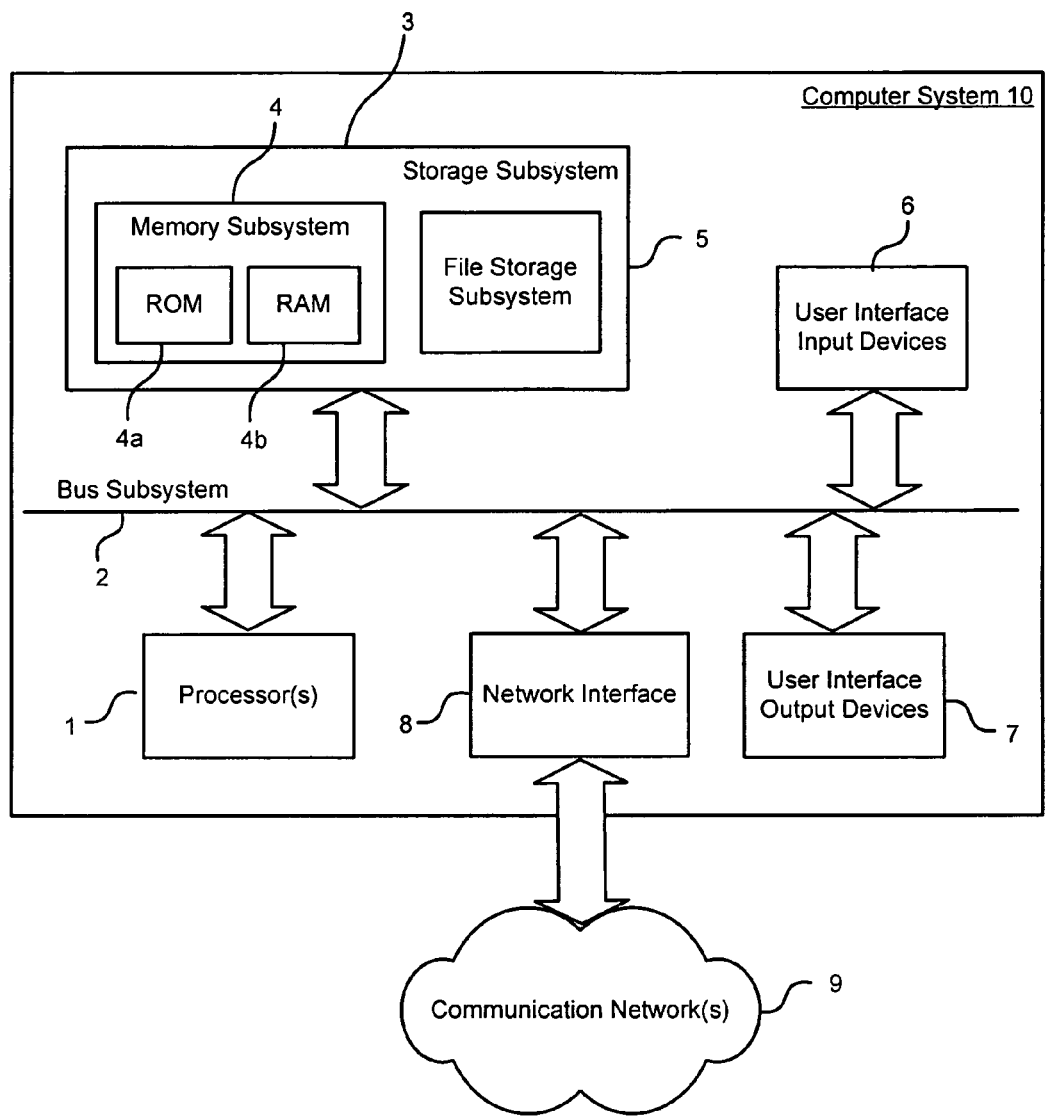
FIG. 1A is a simplified block diagram of computer system 10 for managing electronic records and electronic signatures according to one embodiment of the present invention.

FIG. 1A is a simplified block diagram of computer system 10 for storing and updating electronic records, including electronic records associated with events, according to one embodiment of the present invention. As used herein an electronic record (sometimes referred to as an "eRecord") is a defined set of data captured from a moment in time by software. The data may include any combination of text, graphics, audio, pictorial or other information represented in digital form that is created, modified, maintained, archived, retrieved or distributed by a computer system. Typically, some or all of the data is captured to the electronic record from multiple database tables. System 10 tracks electronic records in a manner such that recorded changes to the records do not obscure previously recorded information.

One example of electronic records includes records maintained by pharmaceutical, medical device, food manufacturing and other companies to ensure compliance with Good Manufacturing Practices (GMPs) and 21 CFR Part 11. GMPs are regulations that describe the methods, equipment, facilities, and controls required for producing human pharmaceutical products, veterinary products, biologically derived products, medical devices and processed food among other items. 21 CFR Part 11 establishes a uniform, baseline standard by which the Food and Drug Administration (FDA) will consider electronic records to be equivalent to paper records and electronic signatures to be equivalent to handwritten signatures. The baseline standard provides an enforceable mechanism for accepting electronic records and their associated signatures and provides a level of confidence that electronic records maintained in accordance with the rule will be of high integrity. While specific examples of the invention are often described below in conjunction with maintaining electronic records and signatures in accordance with GMPs and 21 CFR Part 11, it is to be understood that system 10 can be used to store and update electronic records in other industries that do not require conformance to GMPs and/or conformance to 21 CFR Part 11.

As shown in FIG. 1A, computer system 10 includes one or more processors 1 that communicate with a number of peripheral devices via a bus subsystem 2. These peripheral devices may include a storage subsystem 3, comprising a memory subsystem 4 and a file storage subsystem 5, user interface input devices 6, user interface output devices 7, and a network interface subsystem 8. The input and output devices allow user interaction with computer system 10. A user may be a human user, a device, a process, another computer, and the like. Network interface subsystem 8 provides an interface to other computer systems and communication networks including communication network 9, which may be, for example, a local area network (LAN), wide area network (WAN) and/or public network such as the Internet. While not shown in FIG. 1A, in some embodiments network interface subsystem 8 is connected to one or more network server computers, for example by a LAN within network 9. The server computers connect computer system 10 to the Internet and provide appropriate security functions such as a firewall and the like.

Bus subsystem 2 provides a mechanism for letting the various components and subsystems of computer system 10 communicate with each other as intended. The various subsystems and components of computer system 10 need not be at the same physical location but may be distributed at various locations within network 9. Although bus subsystem 2 is shown schematically as a single bus, alternative embodiments of the bus subsystem may utilize multiple buses.

User interface input devices 6 may include a keyboard, printing devices, a mouse, trackball, touchpad, a graphics tablet, a scanner, a barcode scanner, a touch screen incorporated into the display, audio input devices such as voice recognition systems, microphones, and other types of input devices. User interface output devices 7 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from computer system 10.

Storage subsystem 3 may be configured to store the basic programming and data constructs that provide the functionality of the computer system and of the present invention. For example, according to an embodiment of the present invention, software modules implementing the functionality of the present invention may be stored in storage subsystem 3. These software modules may be executed by processor(s) 1. In a distributed environment, portions of the software modules may be stored on a plurality of computer systems and executed by processors of the plurality of computer systems. Storage subsystem 3 may also provide a repository for storing the various databases and files used by the present invention including evidence store 30 and database 34 shown in and discussed with respect to FIG. 1B.

Memory subsystem 4 may include a number of memories including a main random access memory (RAM) 4a for storage of instructions and data during program execution (e.g., execution of an instance of a software system for a database) and a read only memory (ROM) 4b in which fixed instructions are stored. File storage subsystem 5 provides persistent (non-volatile) storage for program and data files, and may include one or more hard disk drives, appropriate removable media cartridges, and other like storage media. One or more of the storage devices may be located at remote locations on other connected computers.

Computer system 10 itself can be of varying types including a personal computer, a portable computer, a workstation or any other data processing system. Due to the ever-changing nature of computers and networks, the description of computer system 10 depicted in FIG. 1A is intended only as a specific example for purposes of illustrating one embodiment of the computer system. Many other configurations of a computer system are possible having more or fewer components than the computer system depicted in FIG. 1A. For example, several other subsystems may be included in computer system 10 depending upon the functions performed by system 10.

Figure 1B:
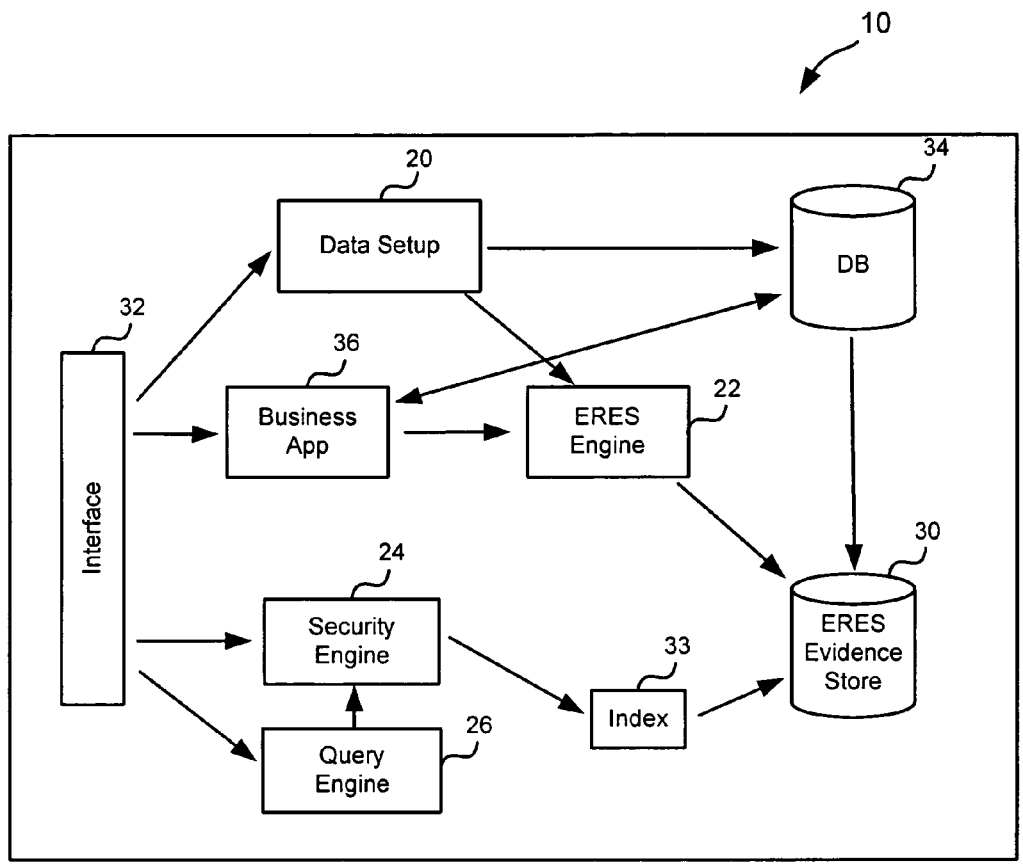
FIG. 1B is a logical block diagram of system 10 shown in FIG. 1A according to one embodiment of the present invention.

FIG. 1B is a logical block diagram of computer system 10 according to one embodiment of the invention. As shown in FIG. 1B, system 10 includes a number of different logical components that are hosted on a computer system, which may include a number of distributed server systems and client systems. The logical components, which for illustrative purposes are shown as electronic record and electronic signature (ERES) setup component 20, ERES framework engine 22, security rule engine 24 and query engine 26 are executed by users 12 to allow system 10 to create, modify, maintain and search electronic records.

System 10 also includes an evidence store 30, a user interface 32 that allows users to interact with the logical components and the evidence store and a database 34. In some embodiments user interface 32 also allows users to interact with one or more business applications 36 that have the capability to invoke ERES engine 32 to generate and send electronic records to evidence store 30 as described in detail below. Business applications 36 can be any application used by an organization that accesses electronic records and/or allows users to electronically sign electronic records. Suitable examples of a business application 36 include any of the more than 160 software modules for financial management, supply chain management, manufacturing, project systems, human resources and customer relationship management that integrate into the Oracle Applications Suite developed and marketed by Oracle, assignee of the present invention.

Database 34 is a collection of information organized in a way that system 10 can quickly select desired pieces of data. Database 34 includes a database management system that enables data to be stored, modified and extracted from the database. The database management system within database 34 provides a database application program interface (API) through which database applications, such as business application 36, can access data managed by the database. Data managed by database 34 can be stored in relational tables that can be queried using any database language supported by the database including, for example, the popular structured query language (SQL).

In one embodiment, database 34 also allows applications to access data stored in the database by translating operating system I/O commands into database commands and/or through an alternative API referred to herein as the database file API. The database file API supports file operations similar to those supported by conventional OS file APIs but, unlike OS file APIs, incorporates the database API concept of transactions. That is, the database file API allows applications to specify that a set of file operations are to be performed as an atomic unit.

The database file API commands are translated to database commands by a database file server in the database management system. According to one embodiment database file server is object oriented. Thus, routines supplied by the database file server are invoked by instantiating an object and calling methods associated with the object. In one implementation the database file server defines a "transaction" object class that includes the following methods: insert, save, delete, update, commit and roll-back. The database file API provides an interface that allows external entities, such as application 36, to instantiate and use the transaction object class.

The methods invoked on a single transaction object may involve multiple file operations. If one of the operations fails during the instantiation of the transaction object, a roll-back process is invoked that undoes the changes made by the transaction object. In one particular embodiment, database 34 is a collection of software programs and/or components available from Oracle, such as Oracle Database. It is to be understood that database 34 can be any system, however, that organizes data in a manner that allows system 10 to quickly select desired pieces. It is also to be understood that components 20-36 are logically represented in FIG. 1B and that system 10 can include fewer, more or differently arranged logical components.

Evidence store 30 is a secure, common repository of electronic records that can be generated from multiple data sources, such as multiple database tables within database 34, in response to the occurrence of predefined events. As a single repository, all records that need to be kept for compliance with a companies business objectives (e.g., compliance with 21 CFR Part 11) are kept together. Thus, in order to search the companies electronic records, there is no need to search multiple databases on multiple servers.

Generally, data is added to evidence store 30 but never deleted. Individual eRecords can be deleted in one sense (e.g., replaced by a newer record) but the original, deleted eRecord still remains part of the evidence store and can be retrieved if desired. In this manner, the evidence store is a secure database that maintains an audit trail for all records that are added, changed or deleted from the evidence store. In doing so, system 10 tracks for each eRecord when a change was made, who made the change and creates a record of the before and after information. The audit trail cannot be altered or disabled by users of the system and allows the evidence store to be reconstructed back to any given date and time.

Electronic records stored in evidence store 30 include unstructured data, such as data stored in character large object (CLOB) format, in one or more columns of a database table. In one embodiment the unstructured data includes a well-formed XML document stored within a single table or column of the database. While each XML document adheres to a structure (e.g., a particular DTD) and in one sense is thus structured data, the database column the XML document is stored in is unstructured in the sense that it can store XML data that adheres to a variety of DTDs and thus is not limited to storing data that adheres to a particular structure. The XML format provides portability and longevity to the data captured in electronic records. The XML document may include numerous proprietary and/or application-specific formats and is thus a highly flexible structure.

In one embodiment, evidence store 30 is part of database 34 and includes four different database tables that are separate from the database tables used to support the one or more business applications 36 and other functions of system 10. These four database tables include a table for storing eRecord details, a table for storing eRecord parameters, a table for storing eSignature details and a table for storing eSignature parameters. Separate tables are used to store eSignature and eRecord parameters because the parameters can be different for different eRecords and their number can also vary significantly. The separate tables maintain the parameters as name-value pairs so that additional columns in the main tables do not need to be added-an approach that is especially beneficial when it is not known how many parameters may exist.

FIG. 2 illustrates one example of database table formats in which eRecord details (table 30a) and eSignature details (table 30b) can be stored in evidence store 30 according to an embodiment of the invention. As shown in FIG. 2, table 30a includes a column for a primary key that is unique to each eRecord generated, a column that stores well-formed XML data generated for the record as unstructured data in CLOB format, a CLOB column that contains a copy of the XML data as it is displayed to users of system 10 and various audit columns including columns for a timestamp when the eRecord was requested, a time stamp of when creation of the eRecord was initiated, the time zone the eRecord was created in, the status of the eRecord (e.g., pending, complete, error), the name of the entity or agent that requested creation of the eRecord, the event that the eRecord was created for, a field that tracks the number of times the eRecord was printed or viewed and information tracking who created and last updated the eRecord. Table 30b stores a record of each eSignature requested and includes a primary key of a signature ID, a document ID that links the signature record to the eRecord (e.g., the primary key of the eRecord), the name of the user (signee) being asked to sign the eRecord, the signee's response, the date and time the eRecord was signed, the time zone that it was signed in and the status of the eSignature (e.g., pending, complete, rejected, error). The signee's response may include, for example, details like the signing reason (whether it's a rework or first attempt), signer type (author, approver, reviewer, etc.).

Figure 3:
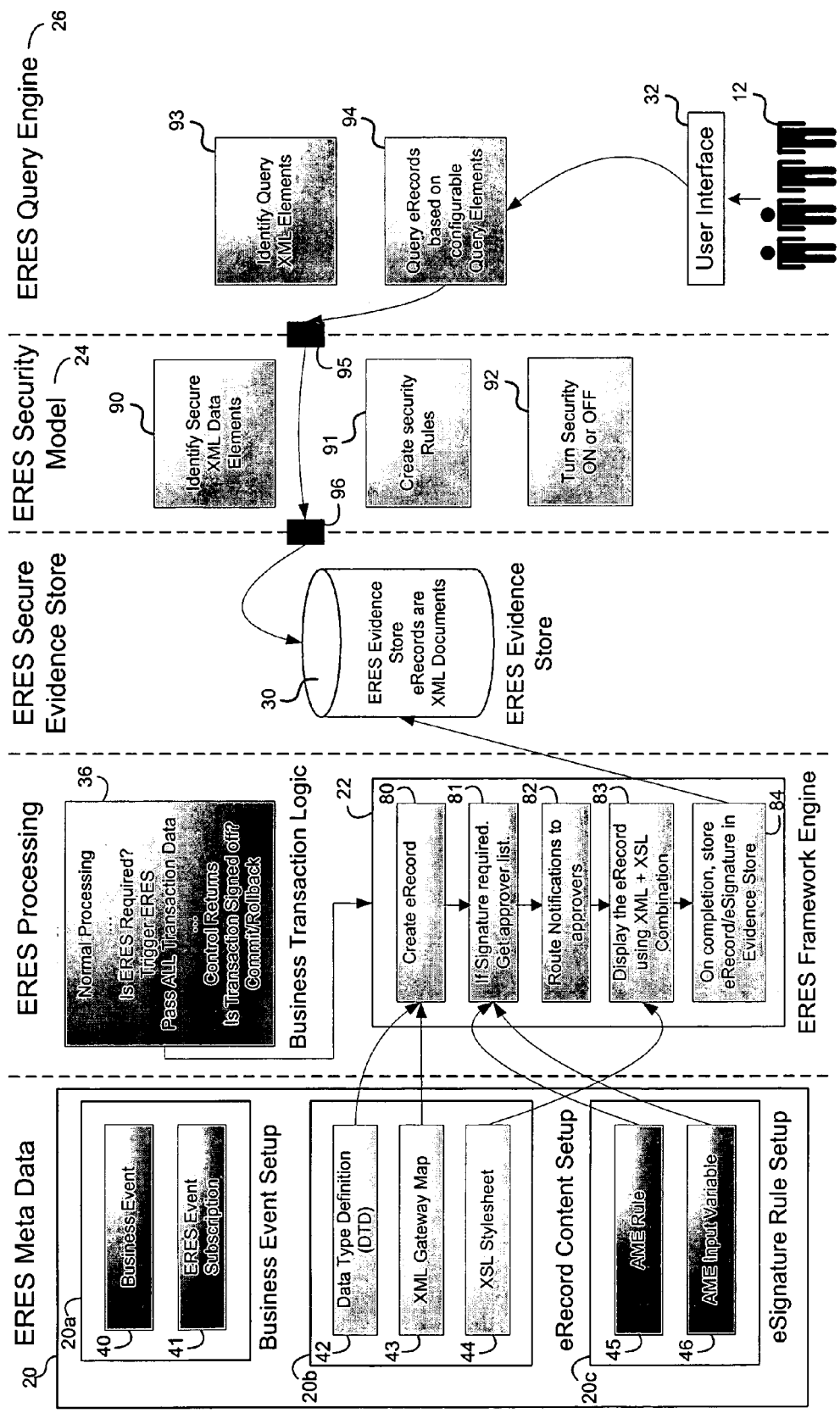
FIG. 3 is a more detailed block diagram of the system shown in FIG. 1B.

Reference is now made to FIG. 3, which is more detailed logic-oriented block diagram illustrating the interaction between selected logical components of system 10 in creating, updating and accessing data in the ERES evidence store according to one embodiment of the invention. The function-oriented diagram of FIG. 3 logically divides system 10 into four separate functions including, from left to right: eRecord and eSignature setup, eRecord and eSignature processing, eRecord and eSignature security features, and eRecord and eSignature query features that operate to create, maintain and access evidence store 30. For convenience, each of these functional aspects of system 10 is discussed in more detail below.

Electronic Record and Electronic Signature Setup

Setup component 20 of system 10 allows a user to perform all the various functions that are required to integrate electronic record tracking and electronic signature capture alone or in conjunction with a business application 36. In the embodiment depicted in FIG. 3, setup component 20 includes multiple subcomponents including a business event setup component 20a, an eRecord content setup component 20b and an eSignature rule setup component 20c.

Business event setup component 20a allows users to define events 40 that, upon occurrence of the event, trigger an action by another component of system 10, such as an action by ERES engine 22. As used herein, an event 40 is an occurrence in a computer application or program, such as an Internet or intranet application, that is significant to other objects in system 10 or to external agents. Event setup component 20a allows users to enable eRecord capture and/or eSignature collection upon the occurrence of the defined event by defining an ERES subscription 41 to the event. This can be done, for example, by storing two Boolean flags for each event: one flag denoting whether or not the event triggers generation of an eRecord and the other flag denoting whether or not the event triggers capture of an eSignature.

eRecord content setup component 20b allows users to define data type definitions (DTDs) 42, define mappings 43 between XML records and entries in database tables and create XSL (extensible Stylesheet Language) style sheets 44 that define layout settings for formatting and presenting eRecords to users. System 10 can store any defined database-to-XML mappings in a data repository, such as database 34 shown in FIG. 1B.

eSignature rule setup component 20c allows users to define rules 45 and an approval hierarchy 46 (approval matrix) for electronic signature events as well as store rule specific attributes such as the type of style sheet to be applied for a particular rule. Rules that can be defined by component 20c include rules related to how long system 10 will wait for obtaining signatures, whether multiple attempts to collect signatures will be made if necessary and, if so, the various timing issues associated with sending multiple attempts or reminder messages. Also in one embodiment of the invention, component 20c allows a user to select one of two distinct methods (rules) by which a required signature is collected: inline signature collection and offline (or deferred) signature collection. Details on these two collection methods are discussed later in the application and they are sometimes referred to as synchronous and asynchronous signature collection, respectively.

Figure 4:
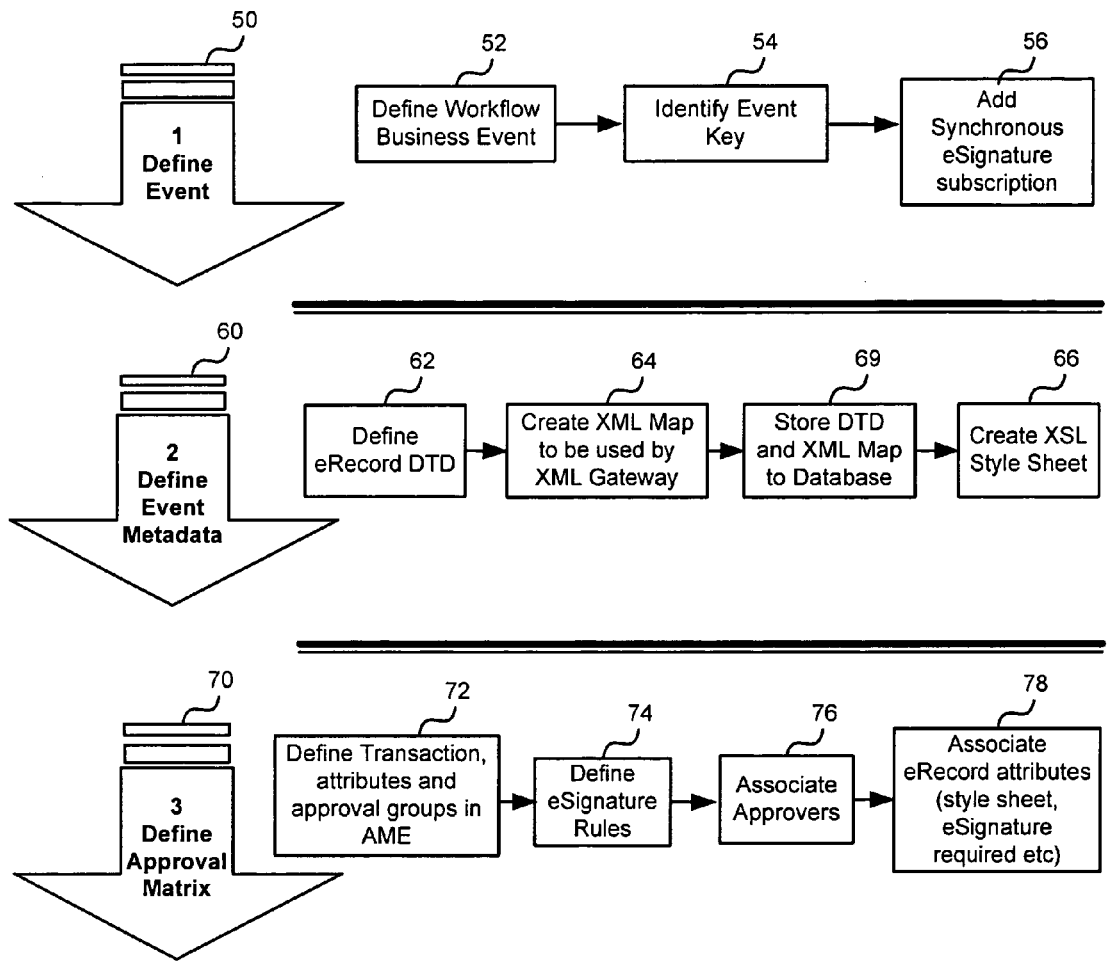
FIG. 4 is a flow chart that depicts various steps involved with setting up system 10 to associate electronic signatures with particular electronic records according to one embodiment of the invention.

System 10 is typically set up by one or more users working with the various components of setup component 20 to define the various events system 10 tracks as well as the rules associated with tracking such events prior to using the system to capture, store and update electronic records. FIG. 4 is a flow chart that depicts various steps involved with setting up system 10 to associate electronic signatures with particular electronic records according to one embodiment of the invention. The setup sequence includes three primary steps as shown in FIG. 4 including: defining events (step 50), defining event metadata (step 60) and defining a signature approval matrix (step 70). While these steps are depicted sequentially in FIG. 4, it is to be understood that the various setup steps may be performed partly or entirely in parallel and that they may occur in an order different than the order depicted in the FIG. 4.

As shown in FIG. 4, event definition step 50 includes a first substep 52 of defining the events 40 that require electronic signatures. In step 52 a user selects a unique name for each such event defined. The event can then be referenced across the framework of system 10 and outside of it by its chosen name. A user needs to know (or at least be able to identify) the event name in order to call the event with an appropriate application program interface (API) from one of business applications 36. In one embodiment the event name is a compound structure of identifiers separated by periods (.) as follows:

"oracle.apps.<product>.<component>.<object>.<event>"

where such a format allows users to organize the events defined into a classification hierarchy.

Figures 5, 6:
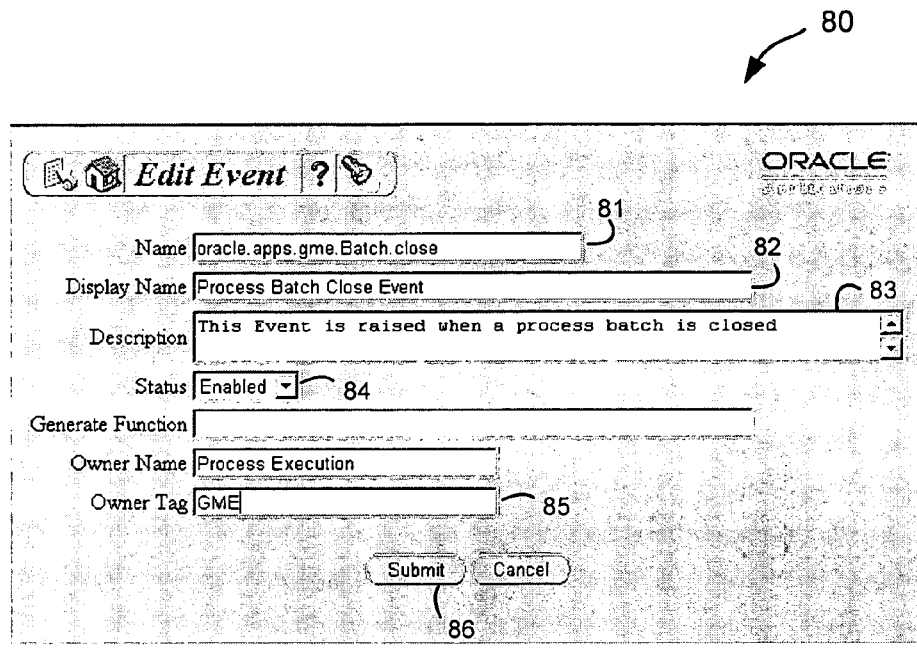
FIG. 5 illustrates one example of an input form that can be completed by a user to enter information related to an event.
FIG. 6 illustrates one example of an approval matrix that can be defined during the process set forth in FIG. 4.

FIG. 5 illustrates one example of an input form 80 that can be completed by a user to enter information related to an event. As shown in FIG. 5, form 80 includes a field 81 to enter the event name, a field 82 that allows a user to select a name by which the event will be displayed in reports, a field 83 where a brief description of the event may be entered a field 84 that contains a status (e.g., enabled, disabled) of the event and a field 85 that indicates the application, such as a business application 36, to which the event belongs.

Once an event 40 is entered into the system by, for example, completing form 80 and selecting submit icon 86 shown in FIG. 5, a user can create a subscription 41 to the event by defining a triggering condition (FIG. 4, step 54) which evokes the event and specifying the processing that occurs when the event is evoked (i.e., when the triggering is met). The specified processing may include calling and executing a piece of code to perform a function and/or sending a message to a workflow process or other agent. A single event can have multiple subscriptions associated with it in which case the subscriptions are assigned a priority level that determines the order of execution. In one particular embodiment the priority is set by a phase number stored in a column of a database table where lower phase number subscriptions are performed or initiated prior to higher phase number subscriptions.

One event subscription that can be defined by component 20a is the requirement for obtaining an electronic signature on an electronic record associated with the event (FIG. 4, step 56). A rule function created by a user with eSignature setup component 20c is associated with the subscription. The rule function determines if an eSignature is required and generates a snapshot of the data to be signed. The snapshot can be generated as an XML document in the rule function and displayed to required signees as dictated by XSL style sheet 44 defined in step 66.

System 10 can implement two types of eSignatures collection: synchronous (or inline collection) and asynchronous (or deferred collection). In one embodiment the phase of the eSignature subscription determines if the subscription is synchronous or not. For a synchronous signature subscription, the phase should be set to carry out eSignature collection as the initial action (e.g., by using the lowest possible phase number) to make sure that the eSignature subscription is the first subscription executed when an event occurs. In one embodiment, an asynchronous signature subscription can be created by setting the phase number above a phase number that represents a predetermined limit on the number of possible synchronous subscriptions. In other embodiments the synchronous/asynchronous nature of individual subscriptions can be set using other techniques, such as, for example, storing a Boolean attribute for each subscription.

Asynchronous signature collection allows system 10 to collect signatures when the signature does not need to be obtained immediately, the signer(s) are not in the same physical location or are otherwise not immediately available at the time of signature request or there are one or more items that the signer must verify prior to signing that would create a time lag between receipt of the signature request and the response. Asynchronous signature collection can be implemented with email or another messaging system. In contrast, inline signature collection allows system 10 to capture eSignatures when the signature needs to be captured immediately so as to not delay further processing. In one embodiment an inline signature collection process creates a pop-up window on the computer screen that displays the information captured in the eRecord for the signer to review. The signer must then review and sign the eRecord before further processing associated with the eRecord may occur.

Referring back to FIG. 4, the step of defining event metadata (step 60) includes defining a document type definition (DTD) 42 for each event 40 created in step 52 (step 62). DTD 42 determines the XML representation of all data that needs to be captured by the system for a particular event. The DTD can be defined in plain ASCII format using a text editor such as Notepad. The defined DTD 42 is then used in step 64 to map data, including data stored in database tables, to the event. Each event has certain database entities (objects) and attributes associated with it which need to be monitored and captured during event execution. Event data can span multiple entities.

Step 66 allows a user to decide what information in the DTD should be presented to a signee as well as how the information will be displayed when a signature is requested by an event by allowing the user to create an appropriate XSL style sheet 44. In step 68 DTD 42, XML mappings 43 and XSL style sheet 44 created in steps 62, 64 and 66, respectively, are stored in a computer-readable medium, such as a durable storage device used to store records for database 34 shown in FIG. 1.

eSignature rule setup component 44 allows users to define a signature approval matrix (step 70). The matrix includes rules that determine when an eSignature is required and/or when an eRecord is generated and if an approval is necessary, the identify of the necessary approver or approval group. Component 44 allows the matrix to define a single approver, multiple approvers where approval of each approver is necessary or a group of approvers where approval of only a subset of the group is necessary.

FIG. 6 illustrates one example of an approval matrix 90 that can be defined in step 72. Matrix 90 includes two rules 91 and 92 identified in the matrix as separate rows. Each rule has an associated attribute 93 and approver list 94. The attributes 93 used in matrix 90 include whether or not an eRecord is generated, whether or not an eSignature is required and if so, the style sheet used to present data for review to the approver. Rule 91 is executed if an event occurs at Plant 1 that uses the cyanide. According to rule 91 all such events should be recorded as an eRecord and executed only upon obtaining approval of two individuals: James Dunn and Mark Arthur. According to rule 92, all events occurring at Plant 1 should generate an eRecord for recording but unless other conditions are also met, e.g., the event includes cyanide, an eSignature is not necessary. If an eSignature is not required, users are not prompted to sign the transaction and in typical cases, the end user is shown a message that indicates the transaction is complete.

Electronic Record and Electronic Signature Processing

In operation, ERES framework engine 22 responds to events generated by business application 36 or other business transaction logic to create electronic records, collect electronic signatures and store electronic records and signatures in evidence store 30 as appropriate. ERES engine 22 can assign each instance of an event (each time the event is triggered) a unique event key that system 10 uses to track eRecord data associated with the particular event instance. The unique key can be passed as a parameter to an API that raised the event.

Referring again to FIG. 3, the blocks within ERES engine 22 represent method steps performed by engine 22 in response to the triggering of a business event 40 by a business application 36 that results in generation of an eRecord to be stored in the evidence store. In one embodiment, the event trigger process results in business application 36 calling an API that initiates a work flow process. The API may include, for example, the event name and an event ID, an indication of whether deferred signature collection mode is allowed for an event or not, the business application that the event was raised from, a username of a person that raised the event and any API or function that should be invoked by system 10 after the completion of the event among other information. The initiated work flow process is then run by the ERES engine.

As shown in FIG. 3, the ERES engine creates an eRecord in response to the trigger event (step 80). The eRecords are based upon the DTDs 42 and XML mappings 43 prepared under the guidance of eRecord content setup component 42 for the event. In one embodiment, upon creation, individual eRecords are stored in a database table that includes the XML data generated from mappings 43 as the mapped data existed at creation time, a copy of the XML data as it is displayed to users in the associated XSL style sheet, a primary key that is unique to each eRecord created in system 10, various time entries such as the timestamp when the eRecord was requested, the time stamp creation of the eRecord was initiated, the time zone the eRecord was created in, the status of the eRecord (e.g., pending, complete, error), the name of the entity or agent that requested creation of the eRecord, the event that the eRecord was created for and a field that tracks the number of times the eRecord was printed or viewed.

If a particular event requires an eSignature, ERES framework engine 22 evokes the appropriate signature collection rule 45 created under eSignature collection rule setup component 20c and instantiates a process to collect approval signatures according to the approval matrix 46 (step 81) associated with the rule. The instantiated process routes a notification that a signature is needed to each necessary approver (step 82). In one embodiment a record of each eSignature requested is stored in evidence store 30 in a database table that includes a primary key of a signature ID, a document ID that links the signature record to the eRecord (e.g., the primary key of the eRecord), the name of the user (signee) being asked to sign the eRecord, the signee's response, the date and time the eRecord was signed, the time zone that it was signed in and the status of the eSignature (e.g., pending, complete, rejected, error).

The notification of the eSignature request can be routed by, for example, email or a pop-up window. In either case, the requested signee is asked to review information associated with the eRecord 80 before granting approval or rejecting the request. The information presented to the signee is formatted according to the style sheet 44 that was created for such purpose (step 83). Once an eRecord has been completed and signed by each necessary signee, ERES engine 22 verifies the electronic signature and changes the status of the eSignature request to "complete" (step 84). Signature verification can be done, for example, by executing a function in the background to determine if all signatures have been obtained and comparing the captured username and password pair for each signature to the system's valid username/password pairs stored in database 34.

Events raised by business application 36 that create eRecords typically also result in an update to one or more of the tables of database 34 that tracks data associated with the business application. In this sense the business event can be thought of as initiating a transaction that may or may not get completed. Records of the transaction are stored in the evidence store regardless of whether or not the transaction is completed. i.e., the evidence store provides a complete history of a business event including failed or incomplete events. If the transaction initiated by the event is successfully completed, however, details of the transaction are committed to database 34. The actual transaction data that is updated in database 34 will vary according to the action initiated by the business application.

As one example, consider a scenario in which a trigger event is defined in one business application to generate an eRecord and an eSignature request in response to the creation of a purchase order (the purchase order is the transaction). Thus, when a user select a "create purchase order" option in this particular business application, an eRecord is automatically generated and a work flow process is initiated to capture the appropriate signature to authorize the purchase order. Upon its creation, the eRecord is stored in evidence store 30 with all the various fields of the purchase order completed according to the data that was captured in the eRecord from the mappings 43. The eSignature collection process is then started. The signature collection process displays the purchase order with the captured data according to a predefined XSL style sheet to each signee. The eRecord stored in evidence store 30 stores the captured data in XML format and also stores the data as formatted in the eSignature request.

If authorization for the purchase order is approved by all necessary signees, each signee field in the eRecord in evidence store 30 is updated as "complete" and the purchase order is committed against database 34, i.e., the business transaction is completed. If authorization is denied by a signee with appropriate authority, the eRecord in evidence store 30 is updated to indicate which signee "rejected" the purchase order and the purchase order is not committed against database 34. This may require rolling back some portions of the purchase order transaction process that updated one or more portions of appropriate tables in database 34 so that database 34 is in the same state it was in prior to the purchase order request. In such a case, evidence store 30, however, will store all the necessary information that indicates a particular purchase order was created, authorization for the purchase order was obtained and ultimately denied by a particular individual.

In another example, the purchase order may include one or more fields that require data entered by a user through an electronic form-based data entry process. In such a form-based process, the eSignature request is not initiated until the user completes entry of data in the form and selects an icon such as "obtain authorization". At that time, the eRecord includes the data entered by the user along with any other data captured from database 34 that is part of the eRecord. For example, the automatically captured data may include information such as a customer name and a shipping address and the data entered via an electronic form may include a product code and a quantity indicated. The eRecord will store the purchase order in XML format including the captured customer name and shipping address and the entered product code and quantity.

After an event has been completed, system 10 next invokes the API that was identified in the original event API call, if an API was designated, for post-ERES processing. All eRecords generated and placed in evidence store 30 are committed to the evidence store 30 permanently, i.e., no eRecord can be deleted from the evidence store tables in the ordinary course of business. Also, the XML data captured in each eRecord is captured as a permanent record that also cannot be changed in the ordinary course of business.

Electronic Record and Electronic Security Model

As indicated above, the eRecords stored in evidence store 30 are a repository of very critical information for a company that often needs to be queried for various reasons ranging from internal users perusing the information to regulatory authorities inspecting process records. The information contained in these records can be confidential and critical to the nature of the business. Accordingly, embodiments of the invention allow a company to restrict access to eRecords to prevent any unauthorized access. Such security controls are defined and performed by security rule engine 24.

Security rule engine 24 allows users to identify and tag secure XML data records within evidence store 30, create security rules and, for users having the appropriate security privileges, turn selected security features of system 10 ON and OFF. Security rule engine 24 also provides security mechanisms to ensure that eRecords can never be removed from evidence store 30 and that electronic signatures cannot be excised, copied or otherwise transferred to falsify an electronic record by ordinary means. In some embodiments, security rule engine 24 also interfaces query engine 26 to evidence store 30 to ensure that queries on the evidence store do not take place if any active security rule indicates the user initiating the query does not have the necessary access rights.

Security rule engine 24 restricts access contingent on the content of an eRecord and the event for which the eRecord was created. For example, if a number of eRecords are created for a Lot Creation event, a responsible user (e.g., a Security Administrator) should be able to grant access to Lot Creation eRecords with particular lot numbers to individual users or groups of individual users. Engine 24 can be configured to operate in one of two modes: restrict mode in which access to eRecords is granted by default and users or responsibilities can be restricted as required and grant mode where access to eRecords is restricted by default and users or group basis based upon responsibilities assigned to the group are granted access to specific records based on the values or data contained in the record. Security rule engine 24 then allows security rules that grant or restrict access to secured content to be created on an individual basis or responsibilities.

The eRecords stored in evidence store 30 are XML documents adhering to particular DTDs defined by users of system 10. Before a security rule can be created using a particular XML element, the element has to be identified as a "secure element" (FIG. 3, function 90). A secure element is essentially an XML element identified in a particular DTD with a special use of being able to create security rules. Security rule engine 24 allows users to identify secure elements via a graphical user interface (GUI). In one embodiment, the first step in identifying a secure element is to select the element as an indexed element or an "IXE". Once an element is indexed, security rules and queries (discussed below) can be created for it.

System 10 can track indexed elements by setting an appropriate Boolean flag as an attribute of the element. That is, an element is either indexed or not indexed. In another embodiment the indexing of elements can be tracked by a character field that can have one of two values: e.g., I for indexed, N for not indexed. The default value for each element upon creation of a DTD is "not indexed". This default can be changed by a user using the GUI.

Figure 7:
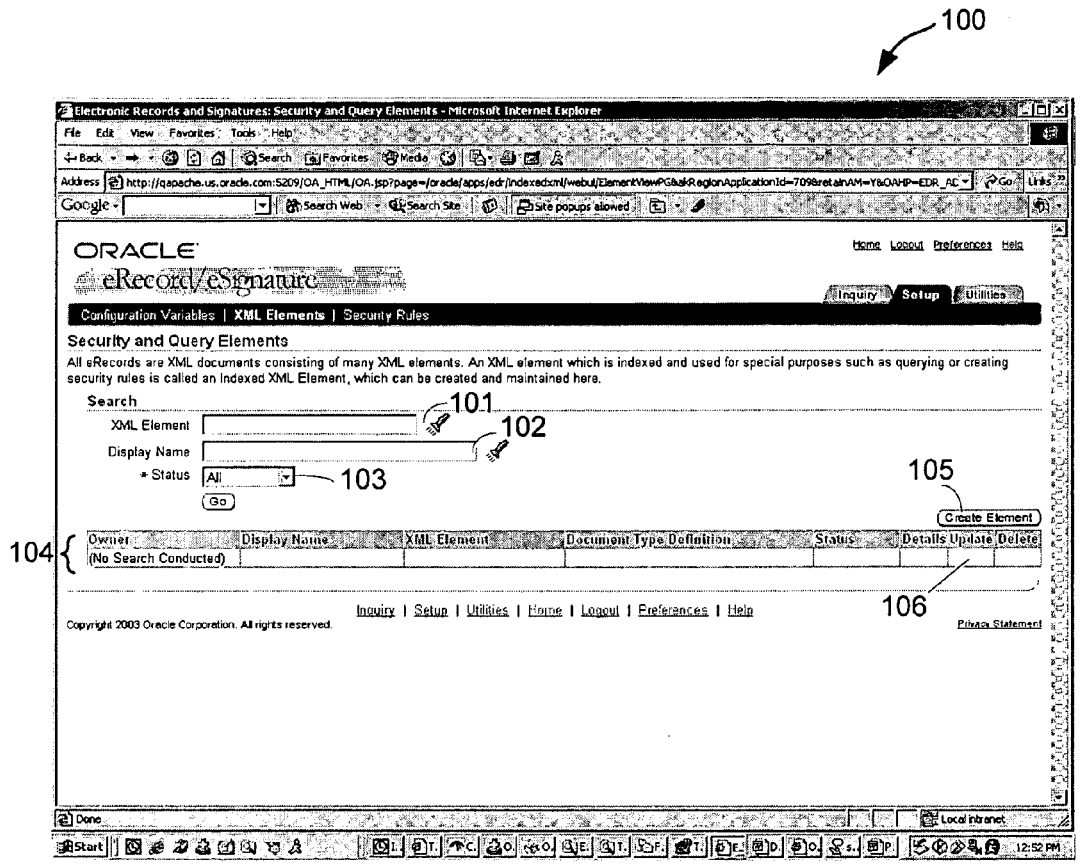
FIGS. 7, 8 and 13-16 are examples of computer display screen shots generated by a graphical user interface to assist a user in creating indexed elements that can be used to create security rules and queries on electronic records stored in evidence store 30 according to one embodiment of the invention.

FIG. 7 illustrates one example of a screen shot (computer display page 100) from a GUI that can be employed to select elements to be indexed. As shown in page 100, XML elements can be searched on the basis of the element name (field 101) or their display name (field 102). A user also has the option of displaying all elements in system 10 that are capable of being indexed, all elements that are already indexed or all elements that are not indexed by selecting an appropriate choice in field 103. The results of the user's search are displayed in area 104.

Figure 8:
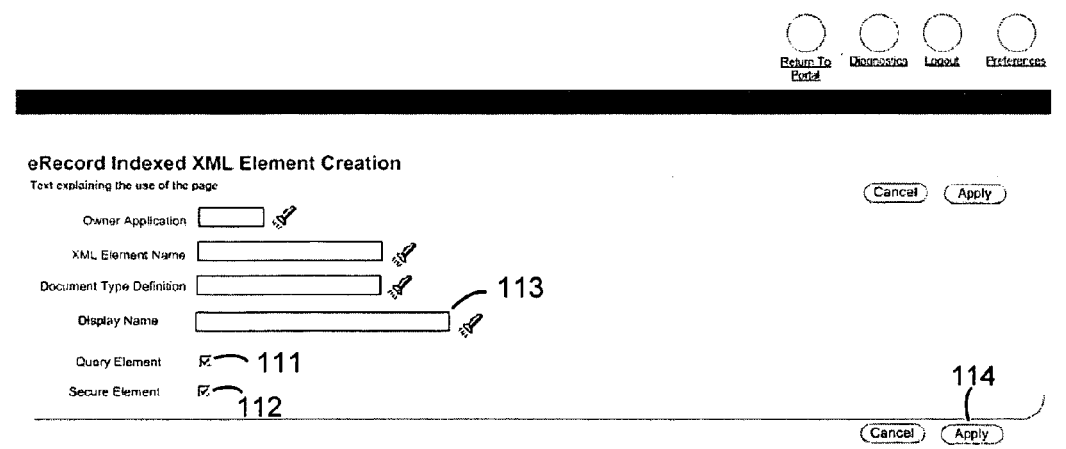

Using icon 105 or field 106, a user can select to create an IXE or update the attributes of an element presented in results area 104 so that its attributes can be changed to an IXE or changed from an IXE to a non-indexed element. An example of an IXE creation screen shot (display page 110) is shown in FIG. 8. As shown in FIG. 8, page 110 includes selection boxes 111 and 112 that allow the user to designate uses for the IXE including whether the IXE is used for security purposes (a secure element), query purposes (a query element) or both (a secure and a query element). Page 110 also includes a field 113 for assigning the IXE a user-friendly name that will appear to users when the IXE is used to create a security rule or in a query.

System 10 creates a domain index (shown in FIG. 1B as index 33) from the indexed elements, or updates the existing domain index, by, for example, selecting apply icon 114 shown in FIG. 8. Index 33 facilitates identifying records containing the elements in the evidence store and includes separate sections that are defined for each indexed element. In one embodiment, index 33 is created using Oracle's interMedia Text product and stored in the internal tables of database 34.

FIG. 9 illustrates one example of database tables that can be used to track indexed elements as part of index 33. Shown in FIG. 9 are three separate tables: table 33a which is used to store indexed elements for eRecords, table 33b which is the translation table for the indexed elements and table 33c which is used to store the usage of an indexed element. As shown in FIG. 9, each of tables 33a-33c include various audit columns that track when an element was created, who created it, etc. Table 33a also includes a indexed element primary key (element_id), a field that map the indexed element to an XML element in a particular DTD, fields that identify the entry in the index (section) for the indexed element as well as the unique tag associated with the entry and a field that tracks whether the indexed element is indeed indexed. Table 33b contains a field that matches the element_id to a display name that can be easily digested by a user and a field that tracks a description of the element. Finally, table 33c tracks the usage of the indexed element as a query element or secure element as discussed further below.

An element chosen to be an IXE is either a generic IXE or a DTD-specific IXE. A generic IXE is an IXE that is applicable to all eRecords in evidence store 30 irrespective of the DTDs. A DTD-specific IXE is an IXE that is applicable to eRecords based only on a particular DTD. This is the case when, for example, the same XML element has different semantics associated with it across different DTDs. Once an element is indexed and designated as a secure element, engine 22 allows users to create security rules with the element (FIG. 3, function 91).

A security rule creates a restriction or provides a grant similar to:

"Allow user James (user id: JASDE) to access eRecords for the event Formula Approval having value Yeast for Formula Ingredient"

where "Formula Ingredient" is the secure element for the event "Formula Approval" and access to value "Yeast" is being granted to user id "JASDE". Similarly, access to a particular user can also be restricted for a specific value. Engine 22 also allows security rules to be established for groups of users having common responsibilities or privileges. For example:

"Allow responsibility Manager to access all eRecords for the event Employee Creation having value Salary for Employee Detail"

Using such security rules, access to the eRecords for specific events can be restricted based on the contents of the eRecords; specifically the value of the secure elements in the eRecord. In addition to allowing users and responsibilities access or restricting such access based on an eRecord's content, engine 22 allows a group of users to be granted access to eRecords while restricting particular users within the group to the records based on their content and it allows a group of users to be restricted from accessing eRecords while allowing particular individuals within the group to be granted such access based on the record's content.

Security elements can be searched for in a manner similar to that described for indexed elements. FIG. 10 illustrates one example of a screen shot (computer display page 120) from a GUI that can be employed to find already defined security elements. As shown in page 120, security elements can be searched on the basis of the element name (field 121), event name (field 122) and either user (field 123) or responsibility (field 124). The results of the search (security rules created for the security element) are displayed in area 125.

As shown in FIG. 10, each security rule has a start date and an end date. This allows a user a lot of flexibility in enabling or disabling security rules without having to delete them or re-create them. A security rule can be deleted by selecting the trash icon 126 for the rule and a new security rule can be created by selecting create security rule icon 127.

FIG. 11 shows one example of a table 33d used to track security rules created according to some embodiments of the invention. Table 33d includes a primary key (rule_id), a field that references the security element (element_id) upon which the rule operates, various fields for tracking the parameters of the rule and audit columns that track who created the rule, when it was created and modified, etc.

Figure 12:
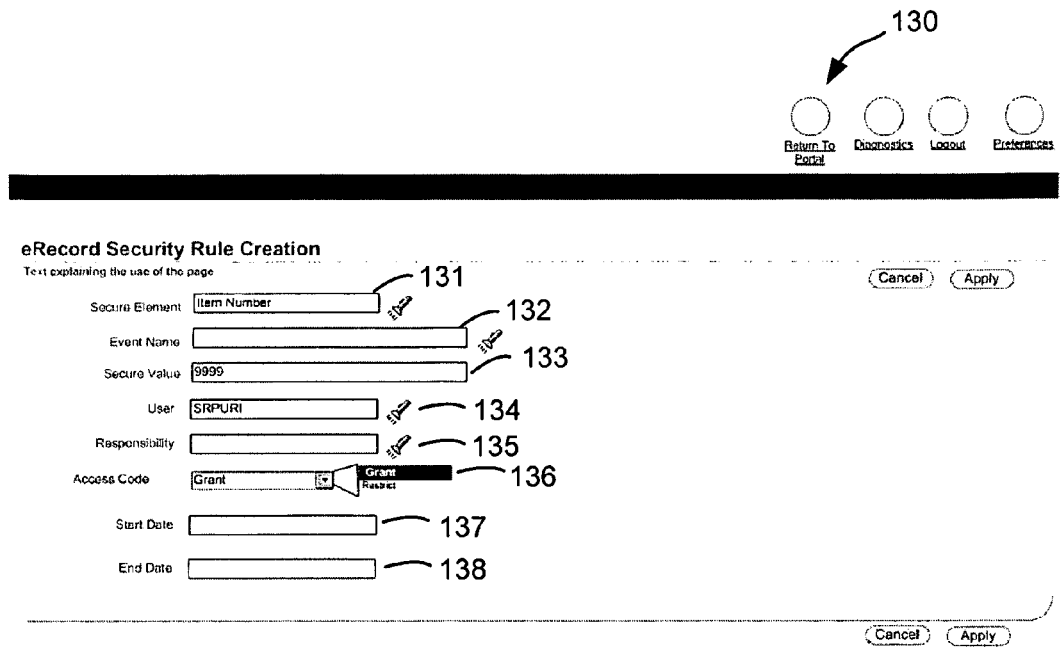

An example of a security rule creation screen shot (display page 130) is shown in FIG. 12. As shown in FIG. 12, page 130 displays the name of the secure element for which the rule is being created (field 131), the event name (field 132) and allows a user to enter a value in field 133 that, if present in an eRecord, will result in the security condition (grant or restrict) as entered by the user in field 136 being applied to the record. The user creating the rule is preferably aware of whether security rule engine 24 has been set to operate in high security mode (default of restricting access to all eRecords unless a rule explicitly grants a user/responsibility access to the record) or low security mode (default of granting access to all eRecords unless a rule explicitly restricts a user/responsibility from accessing record).

Table 1 below lists five exemplary rules and the effect such rules have if engine 24 is set to operate in high security default mode.

TABLE 1

Examples of Rules vs. Effect in High Security Mode

| Rule No. | Security Rule | Effect |
| --- | --- | --- |
| 1 | Grant access to user U1 for formula change eRecords having dry yeast. | None. Access already granted. |

TABLE 1-continued

Examples of Rules vs. Effect in High Security Mode

| Rule No. | Security Rule | Effect |
| --- | --- | --- |
| 2 | Grant access to responsibility R1 for formula change eRecords having dry yeast. | None. Access already granted. |
| 3 | Restrict access to responsibility R1 for formula change eRecords having dry yeast. | Access for R1 restricted. |
| 4 | Restrict access to user U1 for formula change eRecords having dry yeast. | Access for U1 restricted. |
| 5 | 1 + 3 | Access for U1 granted but rest of R1 restricted. |

As evident from the Table 1, creating either rules 1 or 2 does not make much sense as the rules do not have any effect.

Table 2 below lists five exemplary rules and the effect such rules have if engine 24 is set to operate in low security mode.

TABLE 2

Examples of Rules vs. Effect in Low Security Mode

| Rule No. | Security Rule | Effect |
| --- | --- | --- |
| 1 | Grant access to user U1 for formula change eRecords having dry yeast. | Access granted to U1. |
| 2 | Grant access to responsibility R1 for formula change eRecords having dry yeast. | Access granted to U1. |
| 3 | Restrict access to responsibility R1 for formula change eRecords having dry yeast. | None. Access already restricted. |
| 4 | Restrict access to user U1 for formula change eRecords having dry yeast. | None. Access already restricted. |
| 5 | 2 + 4 | Access for U1 granted but rest of R1 restricted. |

As evident from Table 2, creating rules 3 and 4 when engine 24 operates in low security mode does not make much sense because those rules have no added effect.

Referring to FIG. 12 again, the user or responsibility that the rule restricts or grants access to eRecord for can be identified in fields 134 and 135, respectively. Finally, start and ending dates for the rule can be entered in fields 137 and 138. If no end date is entered, the rule will be in effect for perpetuity. If no specific start date is entered, the rule will take effect immediately (e.g., the current date will be entered by default).

A user with appropriate system level privileges can use security rule engine 24 to enable and disable the security features (FIG. 3, function 92). In one embodiment, when security is enabled queries are modified using the defined security rules before running the queries against the evidence store. Referring to FIG. 3, queries can be created by users 12 working with query engine 26 and user interface 32 in the manner explained below. Once a specific query 95 is created and selected to be executed against the evidence store, security engine 24 determines if there are any security rules that are relevant to the query. If there are, the query is dynamically modified by security rule engine 24 based on the defined security rules that are relevant to the query to create a modified query 96. The modified query is then executed against the evidence store and the results are returned to the user. If there are no relevant security rules, the original query (query 95) is run against the evidence store. In one embodiment the determination on whether or not to create a modified query 96 is made by identifying the indexed elements within original query 95 and identifying secure elements created from the indexed elements. A modified query 96 is generated if any secure elements have been created from the same indexed elements used in query 95.

In one embodiment, virtual private database (VPD) technology available from Oracle Corp., the assignee of the present application, is used to dynamically modify each query using the defined security rules prior to running the query against the evidence store. Oracle's VPD technology allows security engine 24 to modify SQL query statements based on a WHERE condition (known as a predicate) returned by a function that implements the security policy. The SQL statement is modified dynamically in a manner transparent to the user using any condition which can be expressed in, or returned by, a function.

As an example of one embodiment of the invention where evidence store 30 evidence store 30 stores eRecords having XML data that include separate field INGREDIENT and DEV_STAGE consider a query generated by a user to identify all eRecords in pertain to ingredient "sugar" where a security rule exists that prevents eRecords associated with a "clinical stage" of the development process from being accessed. The original SQL format for such a query may be represented as:

select document_id
    from edr_psig_documents
    where contains (psig_xml, 'sugar' within INGREDIENT')>0 where the eRecord is identified by its "document_id", "edr_psig_documents" is the name of the table in evidence store 30 that stores eRecords and "psig_xml" is the CLOB column of XML data within the edr_psig_documents table. Security engine 24 modifies the original query by converting the security rule into a predicate that is AND'd with the original predicate of the SQL statement. The modified query may then be represented as:

select document_id
    from edr_psig_documents
    where contains (psig_xml, 'sugar' within INGREDIENT')>0
    and contains (psig_xml, 'clinical_stage' within DEV_STAGE')+0=0 where the second contains clause was added by security engine 24.

As evident from the above described indexing process, a lot of flexibility is provided that allows different semantics to be associated with the same XML element or the same semantics to be associated with different elements. This in turn allows organizations to exercise a tremendous amount of flexibility in securing eRecords to obtain information from data. As an example of this flexibility, consider the following scenario. A user identifies that XML element ITEM_NO in a particular eRecord for an Item Creation event refers to an identification number of a particular class of items and creates a secure element called Item Number using ITEM_NO for these records. The user can also identify that XML element FORMULA_INGREDIENT in an eRecord that conforms to a different DTD for a Formula Creation event also actually refers to the same class of identification numbers as in the previous eRecord. The user can then create a secure element called Item Number using FORMULA_INGREDIENT for these records and thereby link certain security rules defined by the user on the Item Number secure element to both types of eRecords. The user can also identify that the XML element ITEM_NO in a completely different set of eRecords adhering to a third DTD actually means something entirely different, such as a contract term in a Procurement Contract event. The user can then go ahead and create a secure element called Contract Term using the ITEM_NO element for these eRecords. Based on this scenario, a user can then create a security rule that, for example, restricts access to user "Neo" for all eRecords that include the secure element Item Number having a value of 057. This rule would then secure such eRecords generated from Item Creation and Formula Creation events but would not secure eRecords generated from a Procurement Contract event.

Electronic Record and Electronic Query Engine

The eRecords stored in evidence store 30 often need to be queried for various reasons ranging from internal users perusing the information to regulatory authorities inspecting process records. Query engine 26 allows users to identify XML elements upon which queries and searches are to be performed and allows users to generate and execute queries based on the identified elements. To perform such queries, however, a user needs to be able to distinguish fields in different DTDs defined by the users in step 62 (FIG. 4) that have identical XML field names yet represent different pieces of data. For example, evidence store 30 may include many different electronic records that have an XML document identifying an "item number" that is part of the record. The "item number" in each XML document may adhere to different DTDs, however, and thus may refer to completely different item lists where a particular number equates to different items in the different DTDs.

As an example, in one DTD (DTD 1) that defines the ingredients for drug X, "item number" may be the unique identifier of each ingredient used to manufacture the drug. In another DTD (DTD 2) that defines the results of a comprehensive drug study, "item number" may be a unique identifier that identifies which drug or placebo was given to a patient. Thus, item number 003 in DTD 1 may be "glycerin" while item number 003 in DTD 2 may be "placebo". Accordingly, a query in evidence store 30 for all records that involve "glycerin" needs to be able to do more than search for an item number of 003.

Embodiments of the invention allow users to use query engine 26 to identify the XML elements of each DTD used to generate an eRecord that can be queried within evidence store 30. As an initial step in defining query elements, the element has to be indexed as described above with respect to security rule engine 24. The indexing process builds a domain index (FIG. 1, index 33) on top of the tables that make up evidence store 30 as described above. The indexed elements can be designated as query elements (FIG. 3, function 93) using the process also described above and used in queries. This process provides the same flexibility in using query elements that was described above with respect to secure elements.

Figure 13:
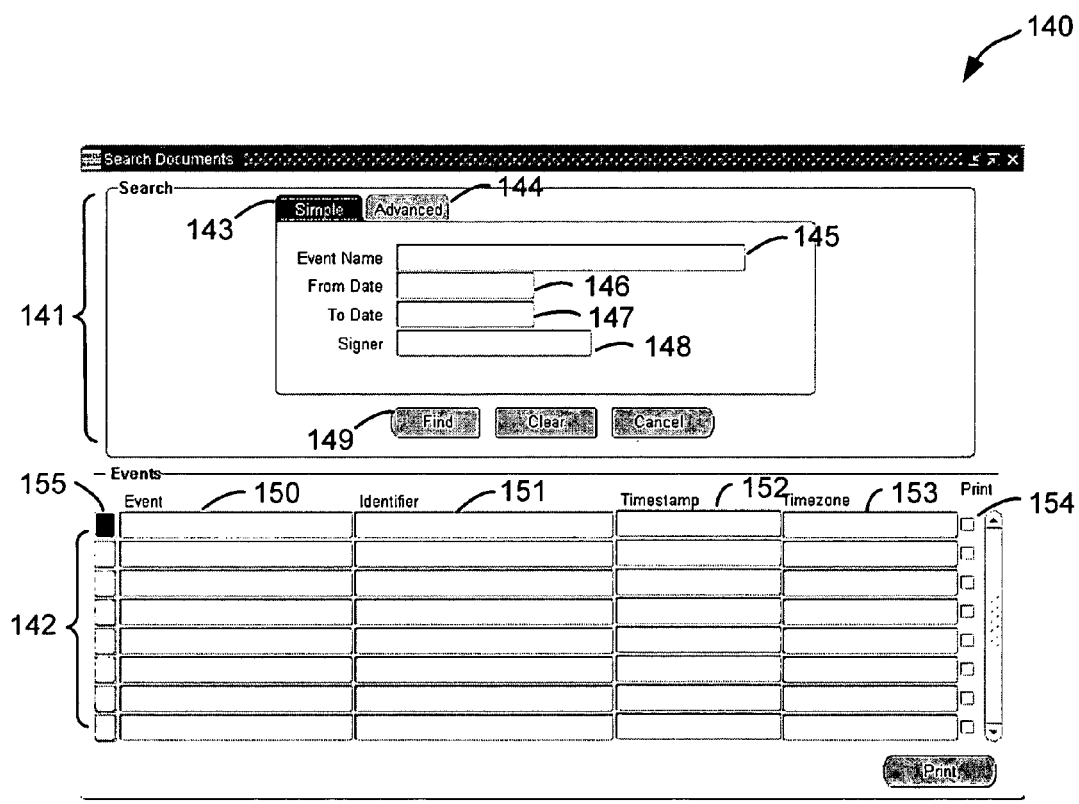

In one embodiment, queries elements can be created under the guidance of a GUI using a display page 140 such as that shown in FIG. 13. As shown in FIG. 13, the query creation page 140 is divided into two sections: a top section 141 allows a user to specify query criteria and a bottom section 142 displays the results of a given query. In top portion 141, a user can select between a simple query (tab 143 or an advanced query (tab 144). The query options in a simple query include event name (field 145), a date range (fields 146, 147) and a user id of an eRecord signer (filed 148). Such queries can be run by selecting find icon 149.

Bottom portion 142 of screen 140 displays header level information from eRecords matching the query criteria including the business event name (field 150), the unique identifier of the event (field 151) and time-related information (fields 152, 153). If desired A user can select to print individual ones of the eRecords by clicking on print selection boxes 154.

An example of an advanced query screen page 160 is shown in FIG. 13. Page 160 allows a user to directly query the XML format of eRecords by allowing a user to select specific XML elements in fields 161 and enter particular values to be searched in field 163. Condition field 162 allows the user to select whether the query is for records that equal the value chosen in field 163, for records having a value less than the chosen value, for records having a value greater than the chosen value, etc. Additionally, a user can include multiple selection criteria in a single query by adding another row to the query and selecting whether the row is to be logically AND'd or OR'd (field 164) with the previous criteria. The advanced query page returns query results to an area 165 that is similar to area 142 shown in FIG. 12 screen. Details of individual eRecords can be displayed from either of query results sections 142 or 165 by clicking on an appropriate selection box 155 or 166, respectively.

Once a query is created (FIG. 3, query 95) it can then be executed against the evidence store (FIG. 3, function 94). Before doing so, however, the query is modified based on the security rules (FIG. 3, modified query 96) as explained in detail above. The modified query is then executed against evidence store 30 only if it does not violate any of the security rules.

Example of Query Capabilities and Security Measures Provided by Invention

FIGS. 15-21 further illustrate the capabilities and functionality that can be obtained using some embodiments of the invention. Specifically, FIGS. 15-21 represent exemplary screen shots and data formats that are created by system 10 in order to implement a scenario where a company that controls a manufacturing application that requires the creation of 'items' and 'lots' containing those items. The company desires that data for business transactions resulting in the creation of either of these two entities be captured as eRecords and stored in evidence store 30. Each eRecords includes a well-formed XML document stored in a single column (column name) of a table (table name) in evidence store 30.

Figure 15:
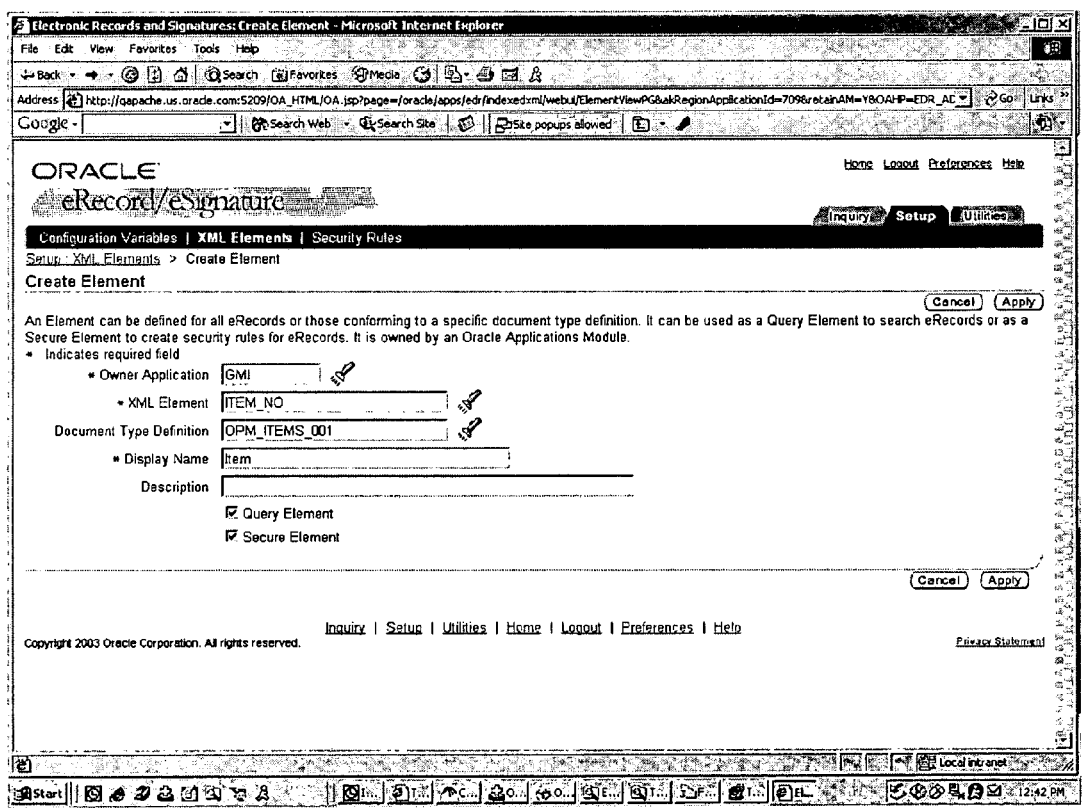
Figure 16:
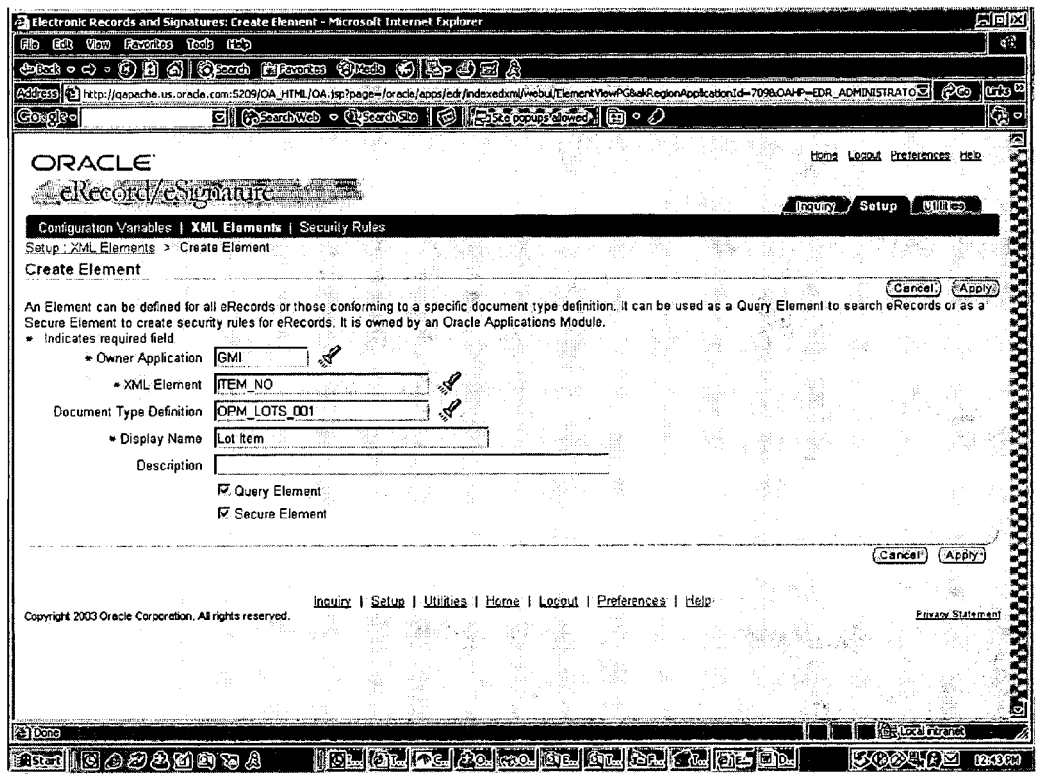
Figure 17:
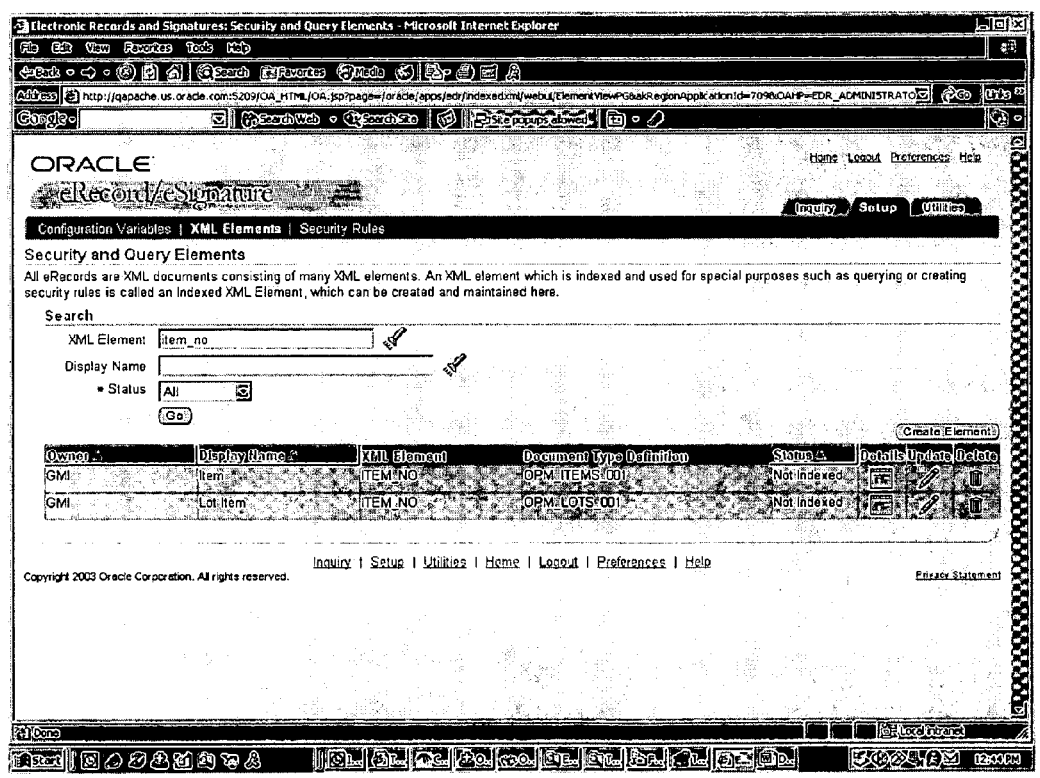

In this exemplary scenario, a transaction that results in the creation of an item is referred to as an 'Item Creation' event and a transaction that results in the creation of a lot is referred to as a "Lot Creation' event. Thus, eRecord are created for both Item Creation and Lot Creation events whenever such events take place. The XML documents (eRecords) that are created for each of these events adhere to different DTDs, however, as defined by a user using data setup component 20. In this scenario, the predefined DTDs for both Item Creation and Lot Creation events include an XML element labeled "ITEM_NO". While this XML element functionally refers to an item number because of the way the DTDs are defined, in the case of an Item Creation event, end users identify the item number with an 'item' while in the case of a Lot Creation event end users identify the item number as a lot item as shown in FIGS. 15 and 16, which are screen shots showing the creation of indexed elements that can be used as both query and secure elements from each XML element by a user. FIG. 17 is a screen shot that demonstrates the XML element 'item_no' is associated with two different indexed elements after creation of the indexed elements as shown in FIGS. 15 and 16.

Figure 14:
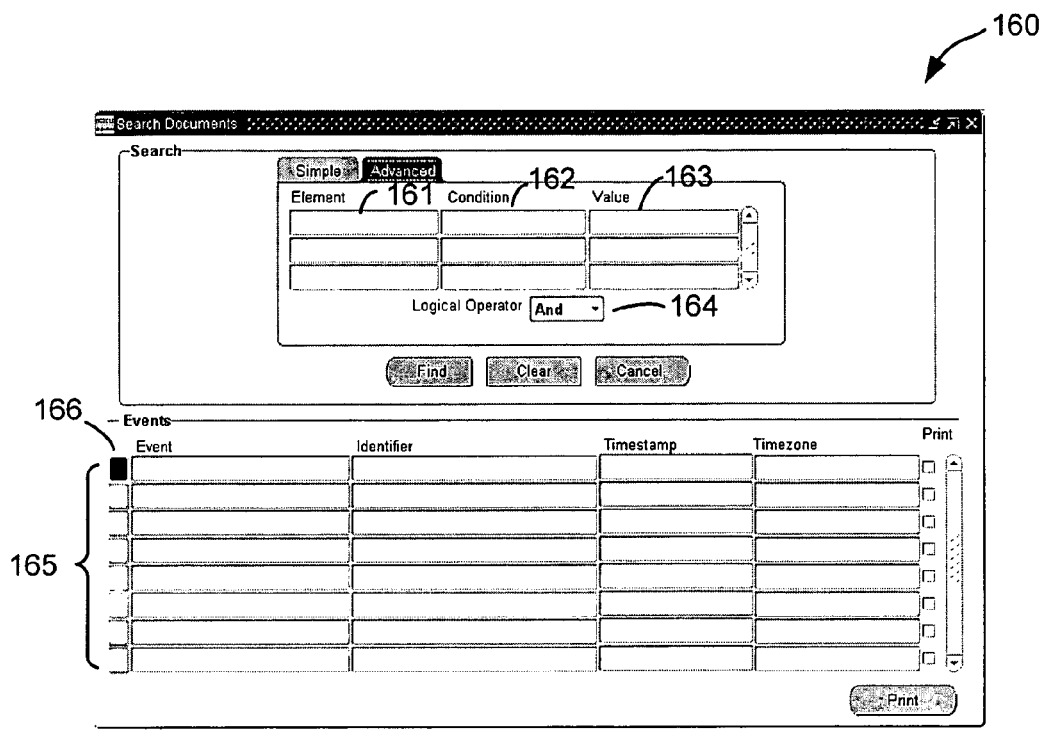
Figures 18, 19:
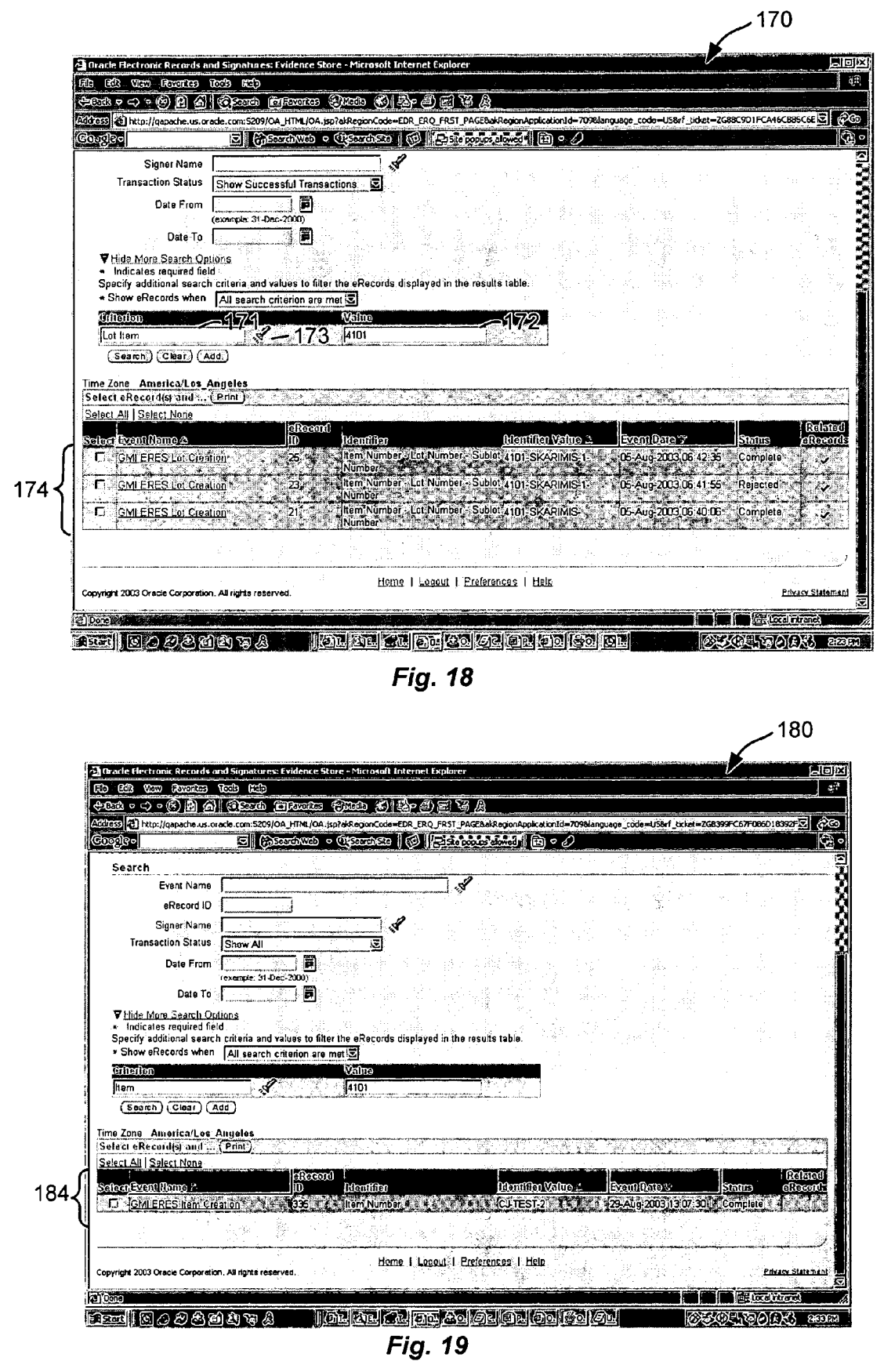

Once the set up of the indexed, query and secure elements is complete, queries using query elements and security rules using secure elements can be created. FIG. 18 is a screen shot 170 illustrating one example of a query that can be created and executed on the data. As shown in FIG. 18, a query can be generated by entering a query element in field 171 and a value in field 172. Query elements can be selected in field 171 from a list of query elements presented in drop down menu format when find icon 173 is selected. In FIG. 18 a user has created a query that will return all eRecords that include a 'lot item" (previously defined as XML element 'item_no' in a Lot Creation event per FIG. 14) that has a value of 4101. The results of the query are shown in area 174. FIG. 19 is another screen shot 180 illustrating another example of a query that can be created and executed on the data. As shown in FIG. 19, a user has created a query that will return all eRecords that include an "item" (previously defined as XML element 'item_no' in an Item Creation event per FIG. 13) that has a value of 4101. The results of the query are shown in area 184. As evident from a comparison between FIGS. 18 and 19, each query only returned results where the XML element 'item_no' equaled 4101 for the DTD the query element is associated with. The XML element(s) that have the same value but that are associated with a different DTD were not returned.

Figure 20:
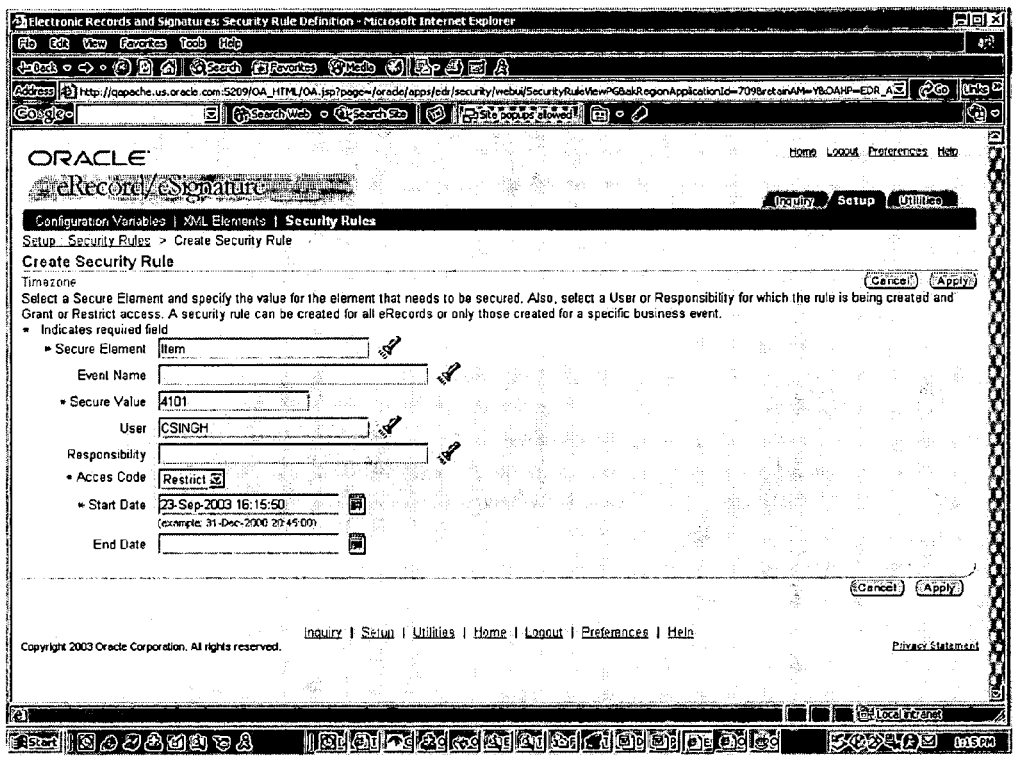
Figure 21:
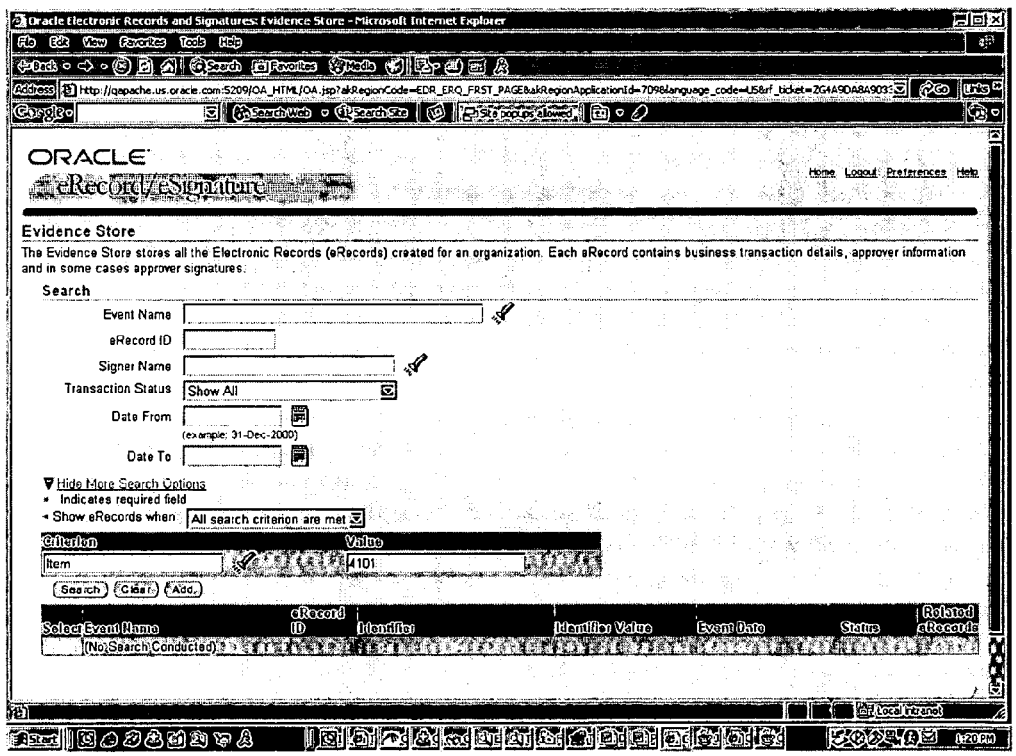

Referring now to FIG. 20, which is an exemplary screen shot illustrating the creation of a security rule that restricts user CSingh from accessing all eRecords where the secure element 'item' (previously defined as XML element 'item_no in an Item Creation event per FIG. 13) has a value 4101. When the same query created in FIG. 19 is now executed on the evidence store by user CSingh, no eRecords are returned as shown in FIG. 21 because the security rule created in FIG. 20 prevents CSingh from viewing the eRecords. If user CSingh ran the query shown in FIG. 18, however, the results would be identical to those shown in FIG. 18 because the security rule created in FIG. 20 only applies to "item" elements and does not apply to "lot item" elements.

Having fully described several embodiments of the present invention, other equivalent or alternative methods of practicing the present invention will be apparent to those skilled in the art. For example, while system 10 was described as a distributed system, the system may be deployed in various other environments such as an enterprise environment, a stand-alone system, and the like. Also, while the present invention has been described using a particular combination of hardware and software, it should be recognized that other combinations of hardware and software are also within the scope of the invention. Specifically, the invention may be implemented primarily in hardware, primarily in software, or using appropriate combinations thereof.

As another example, evidence store 30 was described as containing unstructured data in the form of XML documents. Embodiments of the invention can be used to access other types of unstructured data stored in the evidence store including, for example, data stored in other markup language formats. These and other embodiments as well as alternatives and equivalents to the invention will be recognizable to those of skill in the art after reading the description of the present invention. The scope of the invention should not, therefore, be determined solely by reference to the above description, but instead should be determined with reference to the appended claims along with their full scope of equivalents and alternatives.

What is claimed is:

1. A method of collecting an electronic signature for an electronic record stored in a database, the method comprising:
receiving, at a processor of a computer system, information provided by a user via a graphical user interface configured to enable users of the computer system to define operations by one or more database applications as triggering conditions for predetermined events monitored by the computer system and processing that occurs when the predetermined events are triggered, the information defining a predetermined event that, upon occurrence, causes the computer system to intercept a database transaction instantiated by one of the database applications with a database management system of a database and generate from data identified in the database transaction an electronic record that requires an electronic signature;
receiving, at the processor of the computer system, information provided by the user via the graphical interface that maps data from underlying database tables associated with execution of one or more operations to be performed by a database application in response to the occurrence of the predetermined event to an electronic record;
receiving, at a processor of a computer system, information indicative of an occurrence of a predetermined event, the predetermined event defined to represent a set of operations to be performed by a database application to accomplish a task;
automatically creating, using the processor of the computer system, an electronic record from data stored in a plurality of different database tables associated with execution of one or more operations in the set of operations based on a mapping in response to the occurrence of the predetermined event;
storing, using the processor of the computer system, an instance of the electronic record in a common repository of electronic records that provides an audit trail that cannot be altered or disabled by users associated with the database;
executing, using the processor of the computer system, a rule associated with the electronic record to determine whether an electronic signature is required to connote review and/or approval of the electronic record; and
if execution of the rule results in a determination that an electronic signature is required, marking, using the processor of the computer system, the instance of the electronic record as unsigned and initiating a request to collect the required electronic signature.

2. The method of claim 1 further comprising receiving an electronic signature from the user; verifying the electronic signature; and in response to a positive verification of the electronic signature, marking the electronic record as signed.

3. The method of claim 2 wherein the electronic record is stored in a common repository of electronic records that provides an audit trail that cannot be altered or disabled by users of the database.

4. The method of claim 1 wherein the electronic record comprises unstructured data in a character large object (CLOB) format.

5. The method of claim 3 wherein the unstructured data comprises a well formed XML document stored within a column of a table stored in the database.

6. The method of claim 4 wherein fields of the electronic record are filled with XML data based on a predefined mapping to multiple data sources.

7. The method of claim 1 further comprising the step of, if execution of the rule results in a determination that an electronic signature is required, displaying data from the electronic record on a computer display.

8. The method of claim 7 wherein data from the electronic record is display according to a predefined layout set forth in an XSL style sheet.

9. The method of claim 1 wherein the rule requires a plurality of different electronic signatures and wherein, if execution of the rule results in a determination that a plurality of electronic signatures are required, requesting the plurality of electronic signatures.

10. The method of claim 1 wherein the electronic record is initially marked as unsigned by setting an appropriate attribute associated with a database table in which at least part of the record is stored.

11. A computer system that manages electronic records stored in a database, the computer system comprising:
a processor;
a database; and
a computer-readable memory coupled to the processor, the computer readable memory configured to store a computer program;
wherein the processor is operative with the computer program to:
receive information defining operations by one or more database applications as triggering conditions for predetermined events and processing that occurs when the predetermined events are triggered, the information defining a predetermined event that, upon occurrence, causes the processor to intercept a database transaction instantiated by one of the database applications with a database management system of a database and generate from data identified in the database transaction an electronic record that requires an electronic signature;
receive information that maps data from underlying database tables associated with execution of one or more operations to be performed by a database application in response to the occurrence of the predetermined event to an electronic record;
receive information indicative of an occurrence of a predetermined event, the predetermined event defined to represent a set of operations to be performed by a database application to accomplish a task
automatically create an electronic record from data stored in a plurality of different database tables associated with execution of one or more operations in the set of operations based on a mapping in response to the occurrence of the predetermined event;
store an instance of the electronic record in a common repository of electronic records that provides an audit trail that cannot be altered or disabled by users associated with the database;
execute a rule associated with the electronic record to determine whether an electronic signature is required to connote review and/or approval of the electronic record; and
mark the instance of the electronic record as unsigned and initiate a request to collect the required electronic signature if execution of the rule results in a determination that an electronic signature is required.

12. The computer system of claim 11 wherein the electronic record is stored in a common repository of electronic records that provides an audit trail that cannot be altered or disabled by users of the system.

13. The computer system of claim 12 wherein the electronic record comprises unstructured data in a character large object (CLOB) format.

14. The computer system of claim 13 wherein the unstructured data comprises a well formed XML document stored within a column of a table stored in the database.

15. The computer system of claim 14 wherein fields of the electronic record are filled with XML data based on a predefined mapping to multiple data sources.

16. The computer system of claim 11 wherein the processor and computer program are further operative to obtain and verify the electronic signature, and thereafter, mark the electronic record as signed.

17. The computer system of claim 16 wherein the processor and computer program are further operative to initially mark the electronic record as unsigned by setting an appropriate attribute associated with a database table in which at least part of the record is stored.

18. A computer program product having a computer-readable memory medium storing a set of code modules which when executed by a processor of a computer system cause the processor to manage electronic records stored in a database, the computer program product comprising:
- code for receiving information provided by a user via a graphical user interface configured to enable users to define operations by one or more database applications as triggering conditions for predetermined events and processing that occurs when the predetermined events are triggered, the information defining a predetermined event that, upon occurrence, causes a computer system to intercept a database transaction instantiated by one of the database applications with a database management system of a database and generate from data identified in the database transaction an electronic record that requires an electronic signature;
- code for receiving information provided by the user via the graphical from a user interface that maps data from underlying database tables associated with execution of one or more operations to be performed by a database application in response to the occurrence of the predetermined event to an electronic record;
- code for receiving information indicative of an occurrence of a predetermined event, the predetermined event defined to represent a set of operations to be performed by a database application to accomplish a task;
- code for automatically creating an electronic record from data stored in a plurality of different database tables associated with execution of one or more operations in the set of operations based on a mapping in response to the occurrence of the predetermined event;
- code for storing an instance of the electronic record in a common repository of electronic records that provides an audit trail that cannot be altered or disabled by users associated with the database;
- code for executing a rule associated with the electronic record to determine whether an electronic signature is required to connote review and/or approval of the electronic record; and
- code for marking the instance of the electronic record as unsigned and initiating a request to collect the required electronic signature if execution of the rule results in a determination that an electronic signature is required.

19. The computer program product of claim 18 wherein the electronic record is stored in a common repository of electronic records that provides an audit trail that cannot be altered or disabled by users of the system.

20. The computer program product of claim 19 wherein the electronic record comprises unstructured data in a character large object (CLOB) format.

21. The computer program product of claim 20 wherein the unstructured data comprises a well-formed XML document stored within a column of a table stored in the database.

22. The computer program product of claim 21 wherein fields of the electronic record are filled with XML data based on a predefined mapping to multiple data sources.

23. The computer program product of claim 18 further comprising code for obtaining and verifying the electronic signature, and thereafter, marking the electronic record as signed.

24. The computer program product of program 23 further comprising code for initially marking the electronic record as unsigned by setting an appropriate attribute associated with a database table in which at least part of the record is stored.

25. A computer-implemented method of collecting an electronic signature for an electronic record stored in a database, the method comprising:
- receiving, at a processor of a computer system, information provided by a user via a graphical user interface configured to enable users to define operations by one or more database applications as triggering conditions for events associated with industrial processes monitored by the computer system and processing that occurs when the events are triggered, the information defining an event associated with an industrial process that, upon occurrence, causes the computer system to intercept a database transaction instantiated by one of the database applications with a database management system of a database and generate from data identified in the database transaction an electronic record that requires an electronic signature;
- receiving, at the processor of the computer system, information provided by the user via the graphical user interface that maps data from underlying database tables associated with execution of one or more operations to be performed by a database application in response to the occurrence of the event to an electronic record;
- receiving, at a processor of a computer system, information indicative of occurrence of one or more events associated with an industrial process, each event in the one or more events indicative of a set of one or more operations to be performed by a database application to accomplish a task in the industrial process;
- storing data in the database in a plurality of different database tables using the processor of the computer system in response to execution of one or more operations associated with the one or more events, the data related to the execution of the one or more operations;
- generating, using the processor of the computer system, an electronic record in response to an occurrence of a predetermined event in the one or more events from at least a portion of the data stored in the plurality of different database tables;
- storing, using the processor of the computer system, an instance of the electronic record as a well-formed XML document that tracks the predetermined event in a common repository of electronic records that provides an audit trail that cannot be altered or disabled by users associated with the database;

executing, using the processor of the computer system, a rule associated with the electronic record to determine whether an electronic signature is required to connote review and/or approval of the electronic record; and if execution of the rule results in a determination that an electronic signature is required, marking the instance of the electronic record as unsigned;

requesting, using the processor of the computer system, an electronic signature for the electronic record;

after obtaining the electronic signature, verifying its authenticity using the processor of the computer system; and if the electronic signature is verified as authentic, marking the electronic record as signed using the processor of the computer system prior to committing the database transaction to the database.

* * * * *

UNITED STATES PATENT AND TRADEMARK OFFICE
CERTIFICATE OF CORRECTION

PATENT NO.        : 7,694,143 B2                     Page 1 of 1
APPLICATION NO.   : 10/731299
DATED             : April 6, 2010
INVENTOR(S)       : Srikanth Karimisetty et al.

It is certified that error appears in the above-identified patent and that said Letters Patent is hereby corrected as shown below:

In column 1, line 24, delete "iN" and insert -- IN --, therefor.

In column 1, line 32, delete "Pun" and insert -- Puri --, therefor.

In column 2, line 4, delete "(extensible" and insert -- (eXtensible --, therefor.

In column 10, line 23, delete "(extensible" and insert -- (eXtensible --, therefor.

Signed and Sealed this
Twenty-second Day of February, 2011

David J. Kappos
*Director of the United States Patent and Trademark Office*